United States Patent [19]
Maguire

[11] Patent Number: 6,089,794
[45] Date of Patent: Jul. 18, 2000

[54] VACUUM LOADING SYSTEM

[76] Inventor: Stephen B. Maguire, 935 Parkersville Rd., West Chester, Pa. 19382

[21] Appl. No.: 08/907,787

[22] Filed: Aug. 8, 1997

Related U.S. Application Data

[60] Provisional application No. 60/023,933, Aug. 9, 1996.

[51] Int. Cl.⁷ .................................................. B65G 51/16
[52] U.S. Cl. .............................................. 406/18; 406/34
[58] Field of Search ................................. 406/18, 22, 34, 406/36, 163, 168

[56] References Cited

U.S. PATENT DOCUMENTS

| | | |
|---|---|---|
| 2,161,190 | 6/1939 | Paull . |
| 3,111,115 | 11/1963 | Best ........................................ 119/57.2 |
| 3,115,276 | 12/1963 | Johanningmeier ......................... 222/49 |
| 3,209,898 | 10/1965 | Beebe et al. .............................. 198/671 |
| 3,348,848 | 10/1967 | Lucking et al. ......................... 277/606 |
| 3,470,994 | 10/1969 | Schnell et al. ......................... 198/860.4 |
| 3,959,636 | 5/1976 | Johnson et al. .......................... 364/189 |
| 3,985,262 | 10/1976 | Nauta ...................................... 220/349 |
| 4,026,442 | 5/1977 | Orton .................................... 222/181.3 |
| 4,108,334 | 8/1978 | Moller .................................... 222/136 |
| 4,148,100 | 4/1979 | Moller .................................. 366/156.1 |
| 4,219,136 | 8/1980 | Williams et al. ....................... 222/450 |
| 4,354,622 | 10/1982 | Wood . |
| 4,402,436 | 9/1983 | Hellgren ................................. 222/561 |
| 4,454,943 | 6/1984 | Moller .................................... 198/657 |
| 4,475,672 | 10/1984 | Whitehead .............................. 222/561 |
| 4,498,783 | 2/1985 | Rudolph .................................. 366/132 |

(List continued on next page.)

FOREIGN PATENT DOCUMENTS

| | | |
|---|---|---|
| 507689 | 10/1982 | European Pat. Off. ............... 366/141 |
| 318170 | 5/1989 | European Pat. Off. . |
| 587085 | 3/1994 | European Pat. Off. . |
| 743149 | 11/1996 | European Pat. Off. . |
| 2109840 | of 1972 | France . |
| 2235775 | of 1975 | France . |
| 2517087 | 5/1983 | France . |
| 3541532 | 5/1986 | Germany . |
| 3923241 | 1/1991 | Germany . |
| 4323295 | 2/1995 | Germany . |
| 1235604 | of 1989 | Japan . |
| 4201522 | of 1992 | Japan . |
| 6114834 | of 1994 | Japan . |
| 2081687 | 2/1982 | United Kingdom . |

OTHER PUBLICATIONS

Sheet of 2 photographs of Mould–Tek gravimetric blender, circa 1993.

Sheet of 2 photographs of Motan gravimetric blender and feeding system with Maguire Products, Inc. controls, circa 1993.

Sheet of 3 photographs of UNA–DYN gravimetric blender, circa 1993.

Sheet of 2 photographs of Maguire Products, Inc. gravimetric blender with Conair hoppers and feeding system, circa 1993.

Sheet of 1 photograph of Hydracolor gravimetric blender, circa 1993.

Advertisements entitled "Machinery and Systems for Extrusion is Our Only Business" by Process Control Corporation, circa 1993.

(List continued on next page.)

*Primary Examiner*—Kenneth W. Noland
*Attorney, Agent, or Firm*—Charles N. Quinn

[57] ABSTRACT

Apparatus and methods for providing granular material to a loading hopper preparatory to processing, provide an at least partially transparent receptacle for receiving material prior to processing machinery supplied by the hopper with the receptacle having a top, a valve for selectably connecting the receptacle to vacuum or to ambient air, vacuum drawn in the receptacle, a conduit connecting the receptacle to a supply of granular material, a valve selectably permitting material flow from the receptacle into the hopper and control temporally adjustably closing the first valve and opening the second valve responsively to visually detected presence of a suitable amount of material in the receptacle.

24 Claims, 13 Drawing Sheets

U.S. PATENT DOCUMENTS

| | | |
|---|---|---|
| 4,525,071 | 6/1985 | Horowitz et al. ........................ 366/141 |
| 4,581,704 | 4/1986 | Mitsukawa ......................... 364/479.09 |
| 4,705,083 | 11/1987 | Rossetti ................................... 141/104 |
| 4,756,348 | 7/1988 | Moller ...................................... 141/83 |
| 4,793,711 | 12/1988 | Ohlson ...................................... 366/18 |
| 4,830,508 | 5/1989 | Higuchi et al. .......................... 366/141 |
| 4,848,534 | 7/1989 | Sandwall ................................. 198/535 |
| 4,850,703 | 7/1989 | Hanaoka et al. ..................... 366/160.1 |
| 5,110,521 | 5/1992 | Moller .................................... 264/40.4 |
| 5,116,547 | 5/1992 | Tsukahara et al. ...................... 264/1.1 |
| 5,132,897 | 7/1992 | Allenberg . |
| 5,143,166 | 9/1992 | Hough . |
| 5,148,943 | 9/1992 | Moller ........................................ 222/1 |
| 5,172,489 | 12/1992 | Moller ...................................... 34/472 |
| 5,225,210 | 7/1993 | Shimoda ................................. 425/145 |
| 5,252,008 | 10/1993 | May, III et al. ...................... 406/34 X |
| 5,261,743 | 11/1993 | Moller .................................... 366/196 |
| 5,285,930 | 2/1994 | Nielsen . |
| 5,340,949 | 8/1994 | Fujimura et al. . |
| 5,341,961 | 8/1994 | Hausam . |
| 5,423,455 | 6/1995 | Ricciardi et al. ........................... 222/1 |
| 5,651,401 | 7/1997 | Cados . |
| 5,767,453 | 6/1998 | Wakou et al. . |
| 5,767,455 | 6/1998 | Mosher . |
| 5,780,779 | 7/1998 | Kitamura et al. . |
| 5,843,513 | 12/1998 | Wilke et al. . |

OTHER PUBLICATIONS

Advertisement entitled "Weigh Blender Delivers Unmatched Accuracy" by Universal Dynamics, Inc, circa 1993.

Advertisments entitled "A Full Line–up of Blender Solutions . . . Priced Right!" by HydReclaim, circa 1993.

Advertisement entitled "New From HydReclaim—Now Processors Can Econmically Achieve Continuous Gravimetric Blending" by HydReclaim, circa 1993.

Article entitled "Control Loading Systems" from *Plastics Technology*, Oct. 1995, p. 41.

Advertisement "Introducing our 400 VME–II Gravimetric Blender" by HydReclaim Corporation, circa 1993.

Four–page brochure entitled "Gravimix® Better Quality through Research", circa 1993.

Four–page brochure entitled "Conomix Plus Volumetric Blender" dated Aug. 1993.

Four–page brochure entitled "Conair Franklin Autocolor Y Mezclador" dated Mar. 1995.

Two–sided flyer entitled "GB 140 Series Compact Auto Weigh Blender" published by Conair Franklin in the United States, Jun., 1994.

Six–page brochure entitled "Graviblend Precise Continuous Weigh Blenders" published by Ktron Vertech, Jun., 1991, United States.

Six–page brochure entitled "Piovan Gravimetric Blenders MDW" published by Piovan Srl, Oct. 1993, Venezia, Italy.

One–page flyer entitled "Gravimix, The New Gravimetric Blending Generation" published by Ferlin, Dedemsvaard, Holland circa 1993.

Four–page brochure entitled "When you Weigh it All Up . . . " published by Ferlin Trading, Holland, circa 1993.

Thirty–two page catalog entitled "Maguire Color Blending Equipment" published by Maguire Products, Inc., 1993, United States.

Two–page brochure entitled "Mould–Tek Bulk Handling Systems" published by Mould–Tek Industries, Inc. in Canada, circa 1993.

Brochure entitled "Plastics Molders and Extruders: "published by Maguire Products, Inc., 1995.

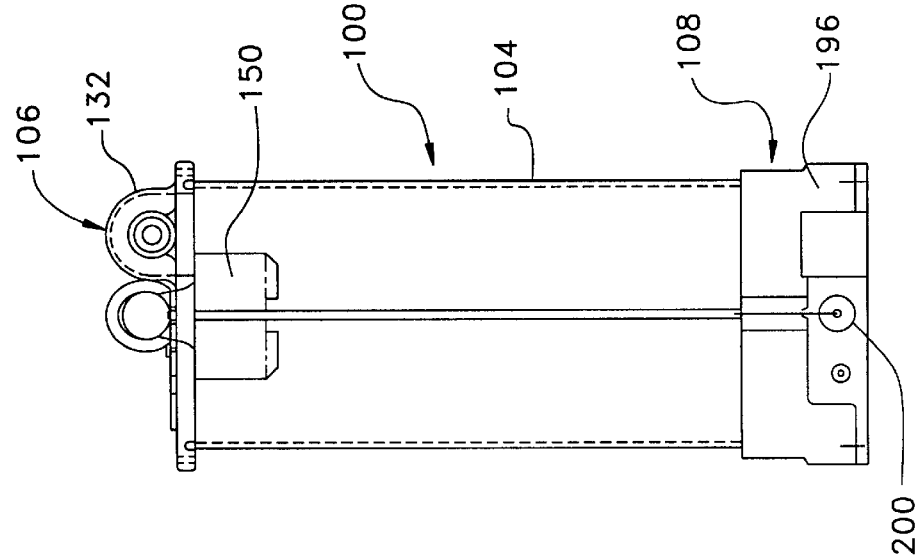
*FIG. 3*
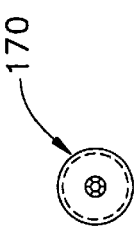
*FIG. 28*  *FIG. 29*
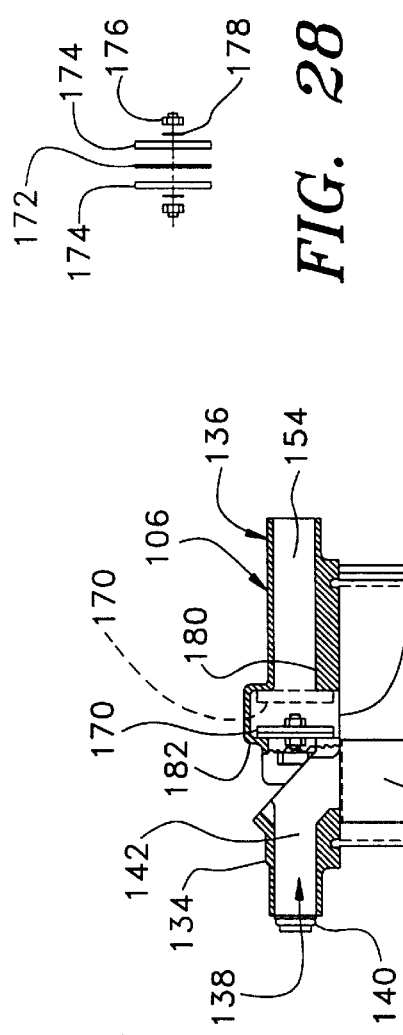
*FIG. 2*

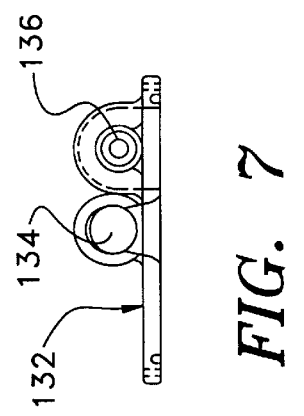
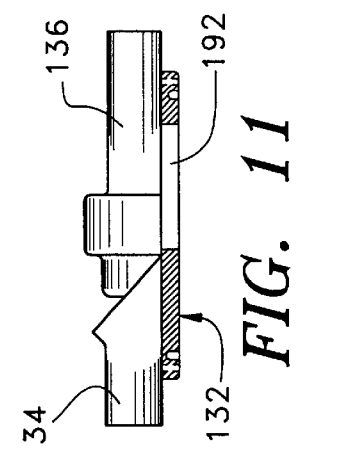
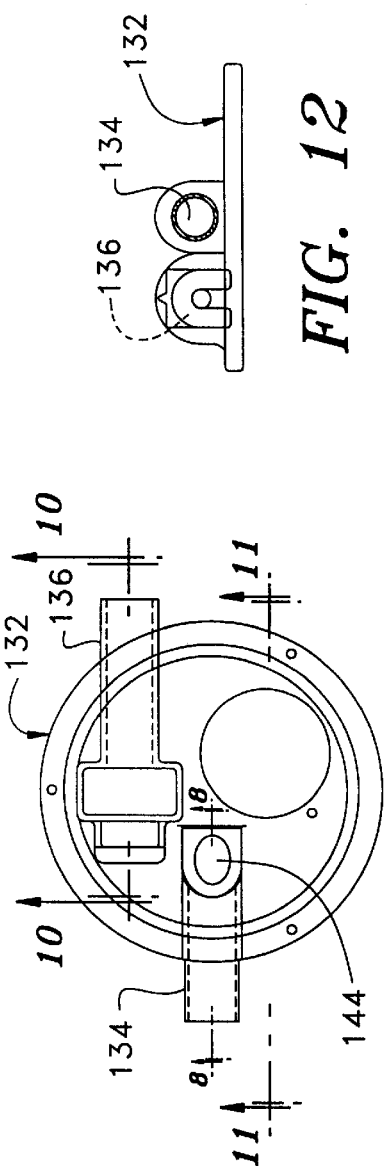
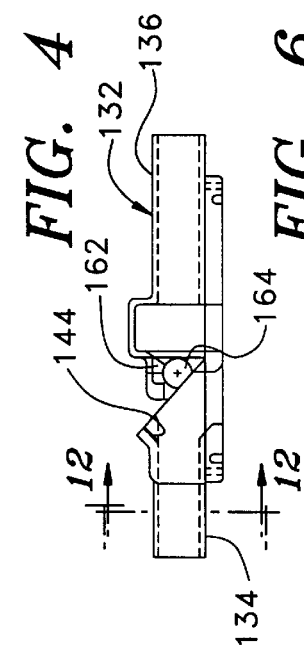
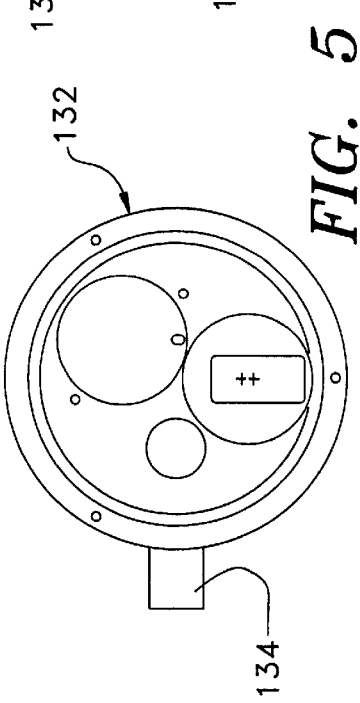
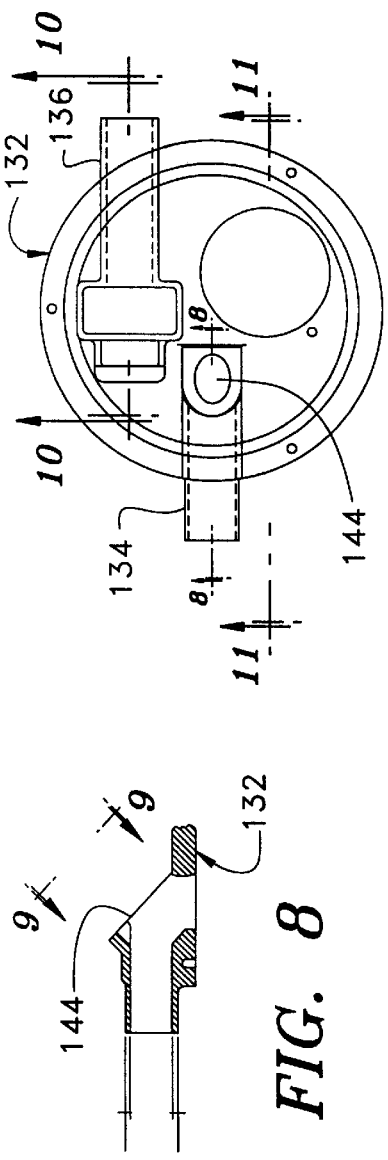
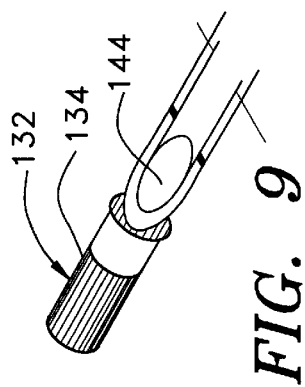
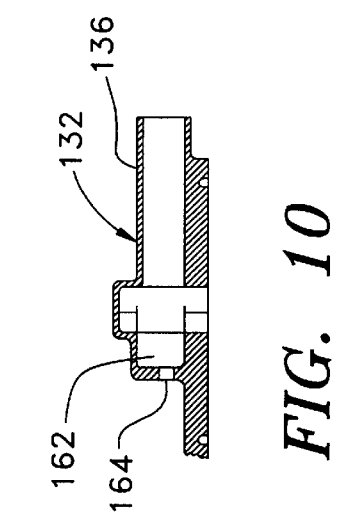

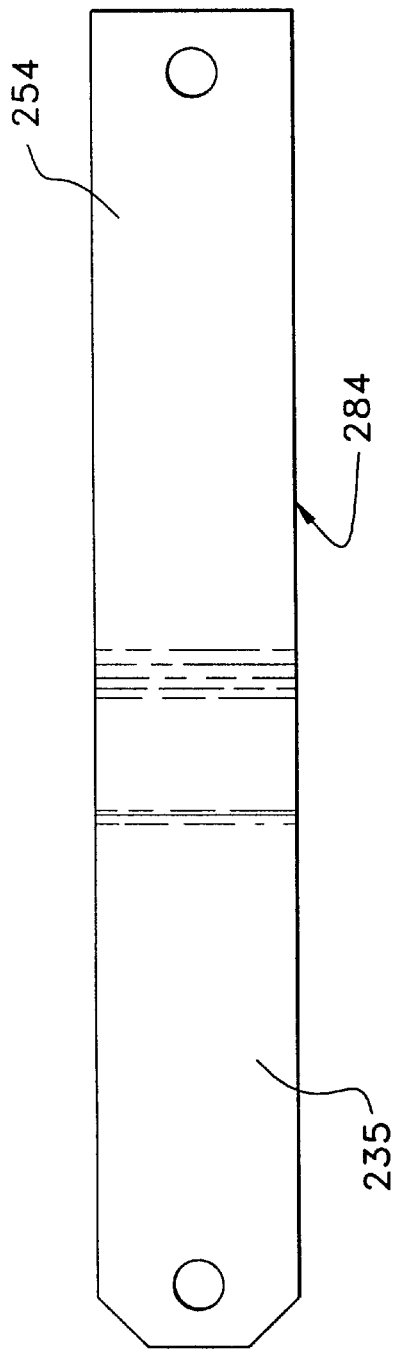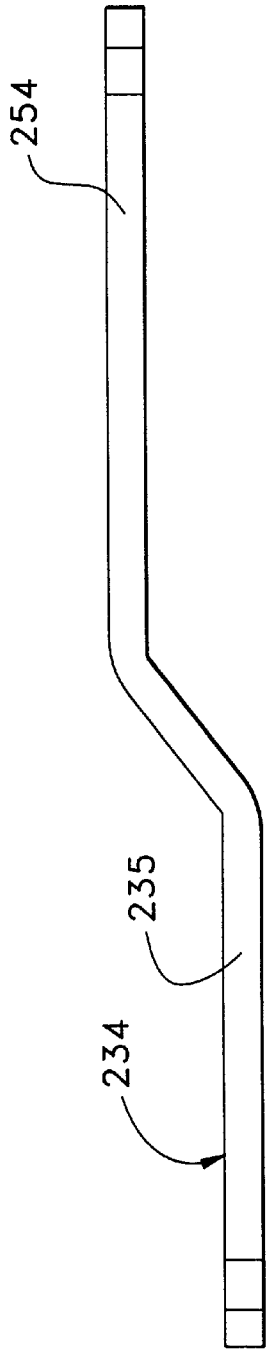

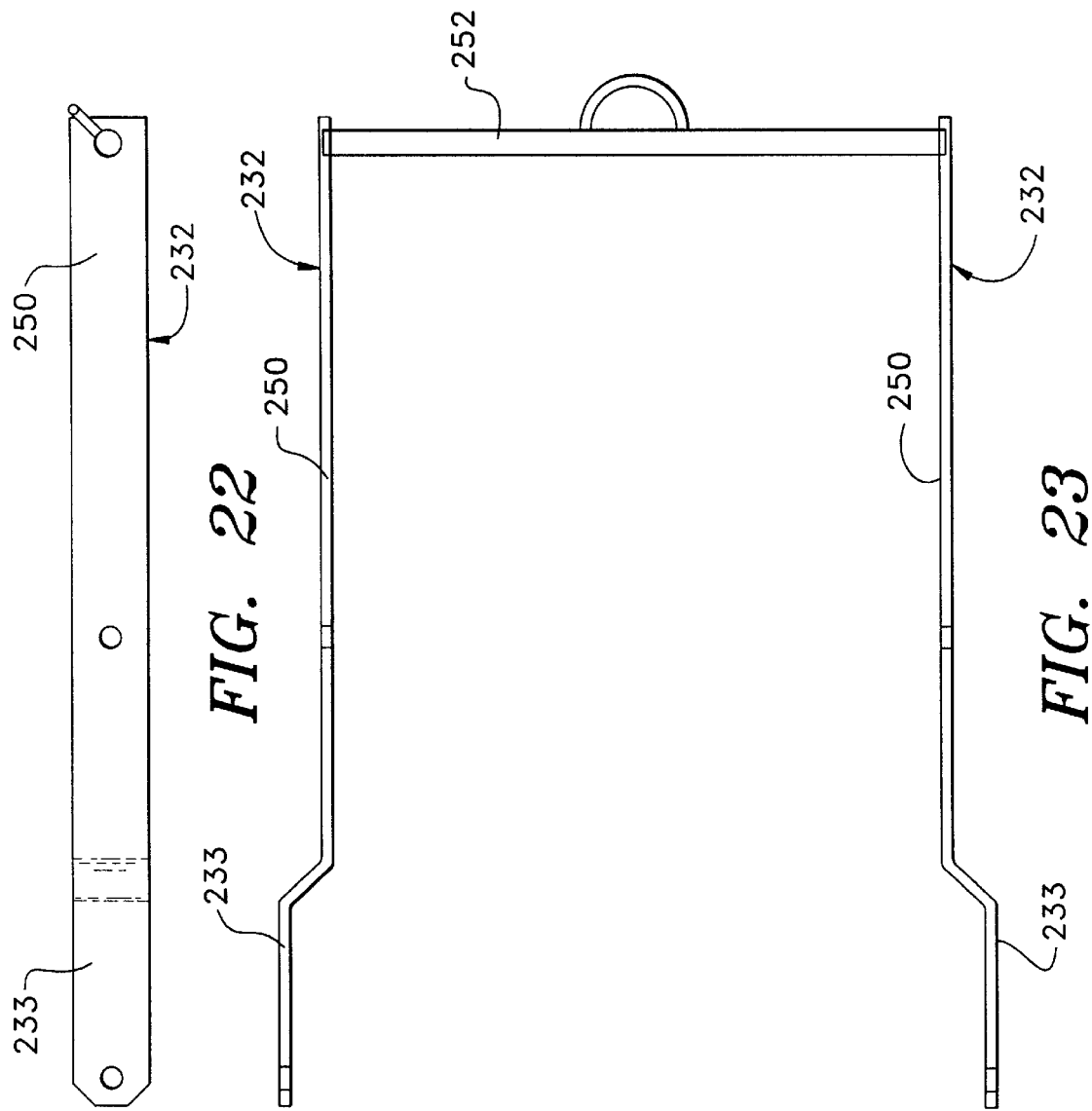

VACUUM LOADING SYSTEM

CROSS-REFERENCE TO RELATED PATENT APPLICATION

This patent application is based on and entitled to the benefit of the filing date of provisional United States patent application 60/023,933, filed Aug. 9, 1996 in the name of Stephen B. Maguire and entitled "Vacuum Loading Apparatus and Method", pursuant to 35 USC 119 and specifically claims the benefit of the filing date of such provisional United States patent application, specifically Aug. 9, 1996, as the effective filing date for the instant application.

BACKGROUND OF THE INVENTION—FIELD OF THE INVENTION

This invention relates to methods and apparatus for feeding granular and powdery type materials to receptacles for storage of such materials prior to processing the materials upon removal from the receptacles. Specifically, this invention relates to methods and apparatus for feeding granular plastic resin materials and additives for granular plastic resin materials to receptacles for storage temporarily in the receptacles prior to removal of the resin materials for processing by plastic molding and extrusion machinery.

BACKGROUND OF THE INVENTION— DESCRIPTION OF THE PRIOR ART

In the plastics industry automatic material conveying has been used for many years with vacuum being a common means for such conveying.

Blowers are sometimes used to provide positive pressure conveying. In blower-driven systems, cyclone separators separate air from conveyed plastic resinous material prior to delivery to the material to a final delivery point.

However, vacuum is the preferred means for such conveying. Vacuum systems tend to be cleaner, producing less dust than blower-driven, positive pressure systems.

As a part of a vacuum system it is known to provide a vacuum supply unit as an integral unit, with a vacuum source, the material receptacle and controls for the supply system all combined in a single package. These are inexpensive systems and are similar to conventional home vacuum cleaners and to vacuum cleaners sold under the registered trademark "Shop-Vac" to do-it-yourself home hobbyists. In the industrial context such units may be mounted over a resinous material storage receptacle requiring filling with resinous material. Such units sell for from $600.00 to $2,000.00 in the industrial context.

More sophisticated and better vacuum material loading systems are referred to as "central" systems. Such central systems typically sell for $2,000.00 or more per receptacle or station being loaded and can control from 5 to 40 or more receptacles or loading stations.

In vacuum systems it is known to use cloth filters to filter plastic resinous material from air streams moving towards vacuum pumps. The cloth filters typically become clogged rather quickly, requiring frequent maintenance and replacement. Cloth filters also wear quickly from granular plastics material impact and abrasion.

Existing devices use blow-back techniques to clear the filter between material supply cycles. These blow back devices add cost and complexity to the system.

Some vacuum loading apparatus use wire screens to keep out large particles, thereby allowing small dust particles to move towards the vacuum pump. A large general filter can provide filtering for many or all of the receptacles at once.

It is known to use timers to time the loading of plastic resinous material into receptacles or loading stations. Conventionally, individual timers are used for each loading station with the timers being preset in advance to control loading.

SUMMARY OF THE INVENTION

In one of its aspects this invention provides apparatus for providing plastic resinous or other granular or powdery material preferably to a plurality of receptacles for temporary storage of the plastic resinous or other granular or powdery material preparatory to processing of the plastic resinous or other granular or powdery material. In this aspect the apparatus preferably includes a plurality of receptacles for receiving the plastic resinous or other granular or powdery material prior to processing thereof by plastics processing machinery, such as plastics extrusion machinery, gravimetric blenders, plastics compression molding machinery and/or plastics injection molding machinery or other material processing machinery. The apparatus further preferably includes means for drawing vacuum in the receptacles.

Preferably, the apparatus is used in conjunction with one or more weigh scale or gravimetric blenders, specifically to provide material feed to a receptacle associated with such blender for temporary storage prior to further processing. Alternatively, the apparatus may be used to supply material directly to the input throat of plastics processing machinery or other machinery to which resinous, pelletized or even powdery material is supplied for processing.

The apparatus further preferably includes first valve means for selectably connecting associated temporary storage receptacles with the vacuum drawing means and conduit means for connecting the temporary storage receptacles to one or more supplies of plastic resinous material, or granular additive material such as coloring agents or other material to be added to such resinous material prior to processing, or other powdery or granular materials to be fed and processed.

The apparatus further preferably includes second valve means for selectably permitting plastic resin material flow from the temporary material storage receptacles for processing, and signal means for actuating the first and second valve means responsively to preselected criteria respecting optimal supply of the plastic resin material from the temporary material storage receptacles to plastics material fabricating machines for processing.

The apparatus further preferably includes baffle means at an inlet to the receptacles for directionally deflecting flow of plastic resin material into the receptacle from the conduit thereby dissipating kinetic energy of the plastic resin material.

In the invention at least one of the temporary material storage receptacles may preferably have a top including means for selectably connecting the temporary material storage receptacle either to a vacuum line or to ambient air.

In the invention there may further be provided means for connecting the conduit to the temporary material storage receptacle including a plate inclined at an angle to the direction of material flow into the temporary material storage receptacle for directionally deflecting material entering the temporary material storage receptacle.

In another of its aspects the invention provides apparatus for providing plastic resinous or other granular material to a plurality of loading hoppers, which may be material storage hoppers for weigh scale blenders, and for replenishing the material in the receptacles to preselected material levels preparatory to the delivery of the material therefrom for processing, where the apparatus includes signal control means for actuating first and second valve means responsively to preselected criteria respecting acceptable supply of the plastic resinous material to individual hoppers associated with a weigh scale blender.

In another of its aspects the invention embraces baffle means within at least one of the receptacles at the inlet from the conduit means for preferably thrice directionally deflecting flow of airborne plastic resinous or other granular material drawn into the temporary material storage receptacle from the conduit thereby dissipating kinetic energy of the moving airborne resinous material.

In another aspect of the invention at least one of the temporary material storage receptacles preferably has a one-piece top preferably including means for selectably connecting the receptacle to the vacuum line or to ambient air and means for connecting the material supply conduit to the temporary material storage receptacle including a plate inclined in an angle to the flow direction of material drawn into the receptacle for downwardly deflecting horizontally flowing material entering the temporary material storage receptacle.

In another of its aspects this invention provides a method for providing plastic resinous material to a temporary material storage receptacle and maintaining the temporary material storage receptacle with a preselected level of material prior to processing thereof by extrusion or molding where the method includes drawing of vacuum within a temporary material storage receptacle associated with the hopper of a weigh scale blender, thereby inducing replenishing plastic resin material flow from the supply into the into the temporary material storage receptacle associated with a hopper portion of a weigh scale blender.

The vacuum conveying system apparatus aspect of the invention maintains the receptacles essentially continuously suitably full of granular, preferably plastic resin material by pulling the material from a remote location into the temporary material storage receptacle on an as-needed basis. The process preferably cycles automatically, preferably using a material presence sensor. One vacuum pump and one control unit preferably operate with as many temporary material storage receptacles as necessary to keep many hoppers full.

A receptacle component in the apparatus aspect of the invention includes a vacuum line to the receptacle which is controlled by a valve actuating when a vacuum is required in the receptacle. In one aspect of the invention the valve controls a material inlet port and a clean-out access in a single, preferably aluminum, casting. The material line connected to the receptacle pulls granular, resinous or powdery material under the influence of vacuum from a remote material supply into the receptacle.

A signal stops the loading of material into the receptacle and allows material to exit from the receptacle bottom. This signal may be produced by a material high level sensor or may preferably result from time-out of a preset timer.

The receptacle further includes an exit port which is closed during receptacle loading either by a flap closing by gravity and thereafter being held closed by the vacuum or more preferably by a valve that may be operated by an air cylinder. Preferably, the valve is a slide gate valve providing a vacuum seal for the receptacle.

In one of the aspects of the invention a blast deflection plate is provided in the material air flow stream entering the receptacle. The mix of air and granular material enters the receptacle preferably vertically from the top. However, the conveying line is preferably horizontal as it approaches the top of the receptacle. The conveying line is preferably connected to a tube which is horizontal and which guides the air-material mix towards a blast plate mounted at preferably at a forty five degree angle, which deflects the material entrained in the moving air-material mix downwardly into the receptacle from the top.

In another apparatus aspect of the invention the blast plate is removable and replaceable. The blast plate is preferably steel; aluminum, from which the casting is preferably made, usually wears too quickly. Removability of the blast plate also allows access if a material clog should occur in the vicinity of the blast plate.

A deceleration chamber is provided as a portion of the receptacle to slow the velocity of the air-material mix. This helps gravity separate the material from the air.

With the invention, the air-material mix having the resinous or other granular material entrained within the air is caused to move more slowly after entering the receptacle, to allow gravity to separate the material from the air. The invention accomplishes this by providing a blast shield structure in position to be contacted by the incoming air/material mix. This shield is inside a deceleration chamber preferably defined by a small box-like structure. This positioning of the blast shield within the deceleration chamber allows the air/material mix to spread into a larger flow area, thus losing speed. The geometry is such that all of the material preferably goes through three flow direction changes, bouncing off the chamber walls, with each change further dissipating energy stored in the moving material.

In a further aspect of the invention, an air cylinder operated vacuum valve moves a disk from a position of sealing the vacuum source line to a position of sealing a conduit to atmosphere which is aligned with the vacuum source line, where the air cylinder operated valve is located at the top of the receptacle. In one position the vacuum line is blocked but a passage is open for atmospheric air to enter the receptacle thereby allowing the receptacle to empty. In another position the passage to atmosphere is blocked and the vacuum line is connected to the receptacle thereby permitting vacuum to be drawn in the receptacle and material to be loaded into the receptacle by the vacuum system.

The casting at the top of the receptacle also desirably has a connection for the material supply line formed as an integral part of the casting. This material line preferably enters the casting horizontally. Incoming material is preferably deflected downwardly into the receptacle via a plate desirably mounted at about a forty-five degree angle in the casting. It is desirable to use a removable steel plate for added resistance to wear and to allow access to the receptacle if something should clog the flow path at the bend point.

The receptacle is desirably about an 8 inch diameter, about 14 inch long clear plastic polycarbonate tube, which allows the operator to watch the filling action and to monitor operation of the system.

The vacuum sealing dump gate at the bottom of the receptacle is preferably a slide gate incorporated into the preferably aluminum casting forming the major portion of the bottom of the receptacle. Optionally, an o-ring may be provided for an improved vacuum seal; however an o-ring is not necessary. It may be desirable to provide an o-ring for processing very fine, powder-like materials.

The control portions of the apparatus and method aspects of the invention permit loading each receptacle individually as a receptacle material sensor calls for material to be supplied thereto. When a sensor, preferably in the receptacle or less preferably in a hopper below an associated receptacle, senses a low condition, the receptacle is queued to proceed with loading. To halt loading a simple time out condition is preferably used.

In this aspect of the invention there is preferably provided a single "set timer" button on a controller. While any receptacle is being loaded, the operator may press and hold the set timer button. So long as the button is held, loading of that receptacle continues. When the button is released, loading stops and the shutoff time for that receptacle is reset to the new time determined according to the time the button was released. This resetting and time computation is preferably performed by a microprocessor which senses the shutoff time and stores the relevant information in memory.

BRIEF DESCRIPTION OF THE DRAWINGS

FIG. 2 is a side elevation, partly in section, of receptacle apparatus manifesting aspects of the invention with the receptacle apparatus shown in its assembled condition.

FIG. 3 is an elevation view of an assembled receptacle manifesting aspects of the invention taken looking from the right side in FIG. 2.

FIG. 4 is a top view of the casting forming a majority of the top portion of the receptacle illustrated in FIGS. 1 through 3.

FIG. 5 is a bottom view of the casting illustrated in FIG. 4.

FIG. 6 is a front view of the casting illustrated in FIG. 4.

FIG. 7 is a view of the casting illustrated in FIG. 4, looking from the right hand side in FIGS. 4 and 6.

FIG. 8 is a broken sectional view of a portion of the casting illustrated in FIGS. 4 through 7 taken at lines and arrows 8—8 in FIG. 4.

FIG. 9 is a broken prospective view of a portion of the casting illustrated in FIGS. 4 through 8 taken in the direction of lines and arrows 9—9 in FIG. 8.

FIG. 10 is a broken sectional view of the casting illustrated in FIGS. 4–9 taken at lines and arrows 10—10 in FIG. 4.

FIG. 11 is a sectional view of the casting illustrated in FIGS. 4 through 10 taken at lines and arrows 11—11 in FIG. 4.

FIG. 12 is a sectional view of the casting illustrated in FIGS. 4 through 11 taken at lines and arrows 12—12 in FIG. 6.

FIG. 20 is a front view of a first linkage bar component of the power filter station illustrated in FIGS. 18 and 19.

FIG. 21 is a top view of the linkage bar illustrated in FIG. 20.

FIG. 22 is front view of a second linkage bar component of the power filter station illustrated generally in FIGS. 18 and 19.

FIG. 23 is a top view of two of the second linkage bars of FIG. 22 and a cross-bar joined together forming a component of the power filter station illustrated generally in FIGS. 18 and 19.

FIG. 28 is an exploded side view of a disk portion of a valve member illustrated in FIG. 1.

FIG. 29 is a side view of the disk illustrated in FIG. 28.

DESCRIPTION OF THE PREFERRED EMBODIMENTS AND BEST MODE KNOWN FOR PRACTICING THE INVENTION

Figure 30:
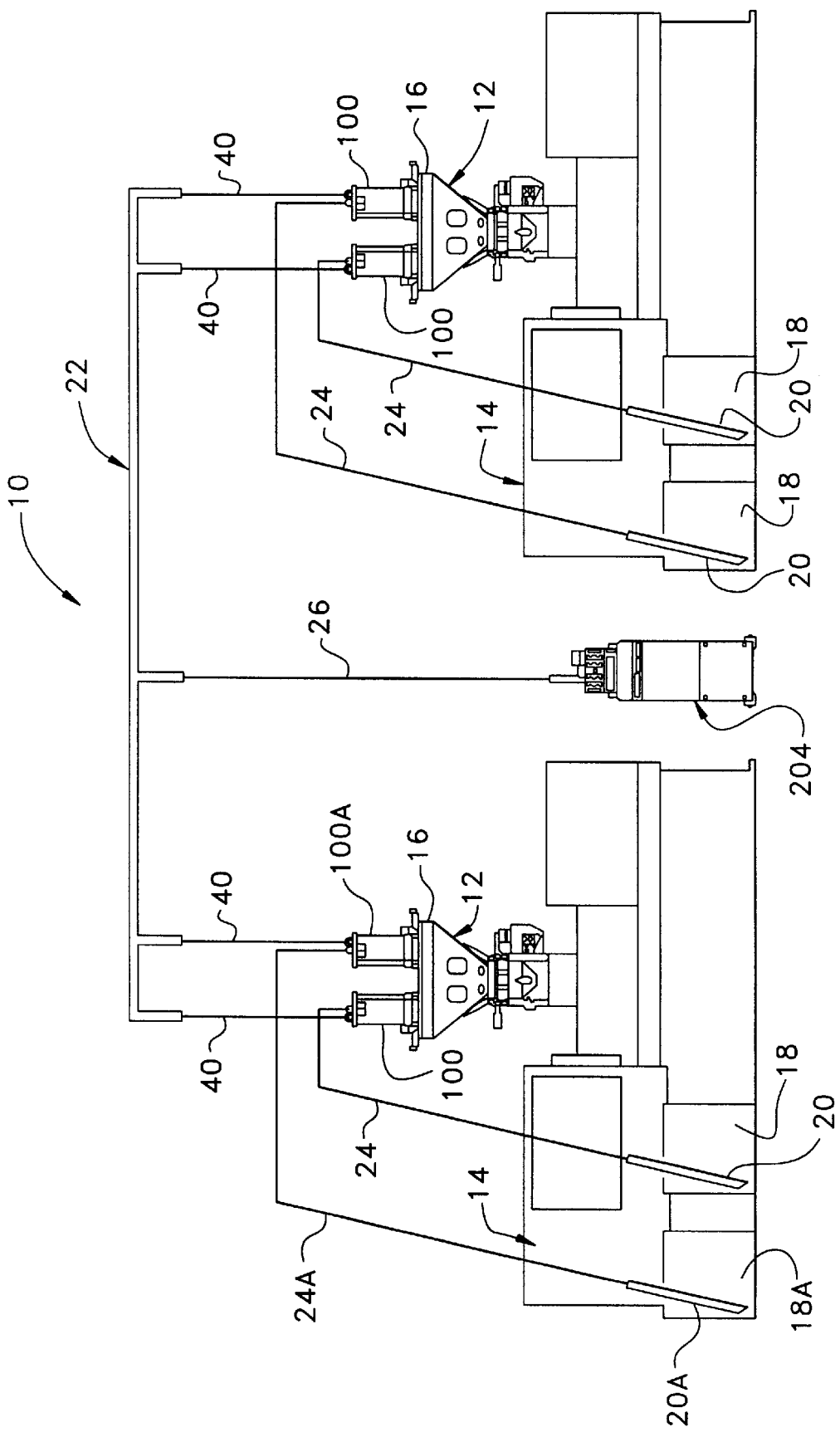
FIG. 30 is a schematic view of a vacuum loading system manifesting aspects of the invention being used to supply granular material to two gravimetric blenders which in turn supply such granular material to respective plastic molding machines.

Referring to the drawings in general and to FIG. 30 in particular, a vacuum loading system in accordance with the preferred embodiment of the invention is designated generally 10 and is used to provide granular material to two or more devices requiring such granular material. In the embodiment illustrated in FIG. 30, the devices requiring such granular material are a pair of gravimetric blenders each designated 12. The gravimetric blenders are preferably mounted on molding machines designated generally 14, which are preferably of the injection molding type. Each gravimetric blender 12 includes a hopper 16, which is preferably divided internally into compartments being supplied with granular material.

Vacuum loading system 10 includes at least one receptacle designated generally 100. A plurality of such receptacles 100 are illustrated in FIG. 30. Each receptacle 100 is preferably mounted on top of hopper 16 and is in communication with one of the internal compartments of hopper 16.

The vacuum loading system supplies granular material from individual granular material storage drums, which have been designated generally 18 in FIG. 30, by drawing granular material as required from storage drums 18 via lances 20, which are preferably in the form of hollow tubes. Flexible material supply hoses 24 are connected individually to ends of lances 20 and provide granular material drawn from individual storage drums 18 to associated receptacles 100 to which individual material supply hoses 24 are connected as illustrated in FIG. 30. For purposes of clarity respecting FIG. 30, one of the material storage drums 18, one of the lances 20, one of the material supply hoses 24 and one of the receivers 100 have been numbered with the letter "A"

following the indicator numeral to identify these as being connected together to supply granular material from storage drum 18A to a particular internal compartment within a hopper 16 of a gravimetric blender 12.

Vacuum loading system 10 as illustrated schematically in FIG. 30 further includes a power filter station designated generally 204 which serves to draw a vacuum via a hose 26, in a manifold designated generally 22. Manifold 22 is connected to receptacles 100 via vacuum lines 40.

Gravimetric blenders 12 illustrated schematically in FIG. 30 are preferably of the type available from Maguire Products, Inc. in Media, Pa.

Manifold 22 is preferably one and one-half inch outside diameter aluminum tubing. Vacuum hose 26 is preferably one and one-half inch inside diameter flexible hose material, as are material supply hoses 24A and vacuum lines 40. The one and one-half inch inside diameter for material hoses 24 and vacuum lines 40 works well where a one horsepower blower is provided as a part of power filter station 204 to draw a vacuum via vacuum hose 26. The one and one-half inch inside diameter for the material and vacuum hoses is suitable when a one horsepower blower is used to draw the vacuum and lengths of material supply hoses 24 are in the neighborhood of twelve feet, for connection with lances 20 inserted into granular material storage drums 18 to receptacles 100, where the length of vacuum lines 40 from receptacles 100 to manifold 22 is on the order of five feet and where the length of vacuum hose 26 from manifold 22 to power filter station 204 is on the order of twelve feet.

When a 2 and ½ horsepower or even a five horsepower blower is used at power filter station 204 to draw a vacuum, it is desirable that vacuum hose 26 be on the order of two inches diameter.

While the vacuum loading system manifesting the invention is illustrated in FIG. 30 has been shown with four receptacles 100 providing granular material from four storage drums 18 to four receptacles 100 associated with gravimetric blenders 12, larger or smaller numbers of receptacles may be accommodated according to the particular electronics utilized to control the system and according to the size of the motor drawing the vacuum at power filter station 204.

Figure 1:
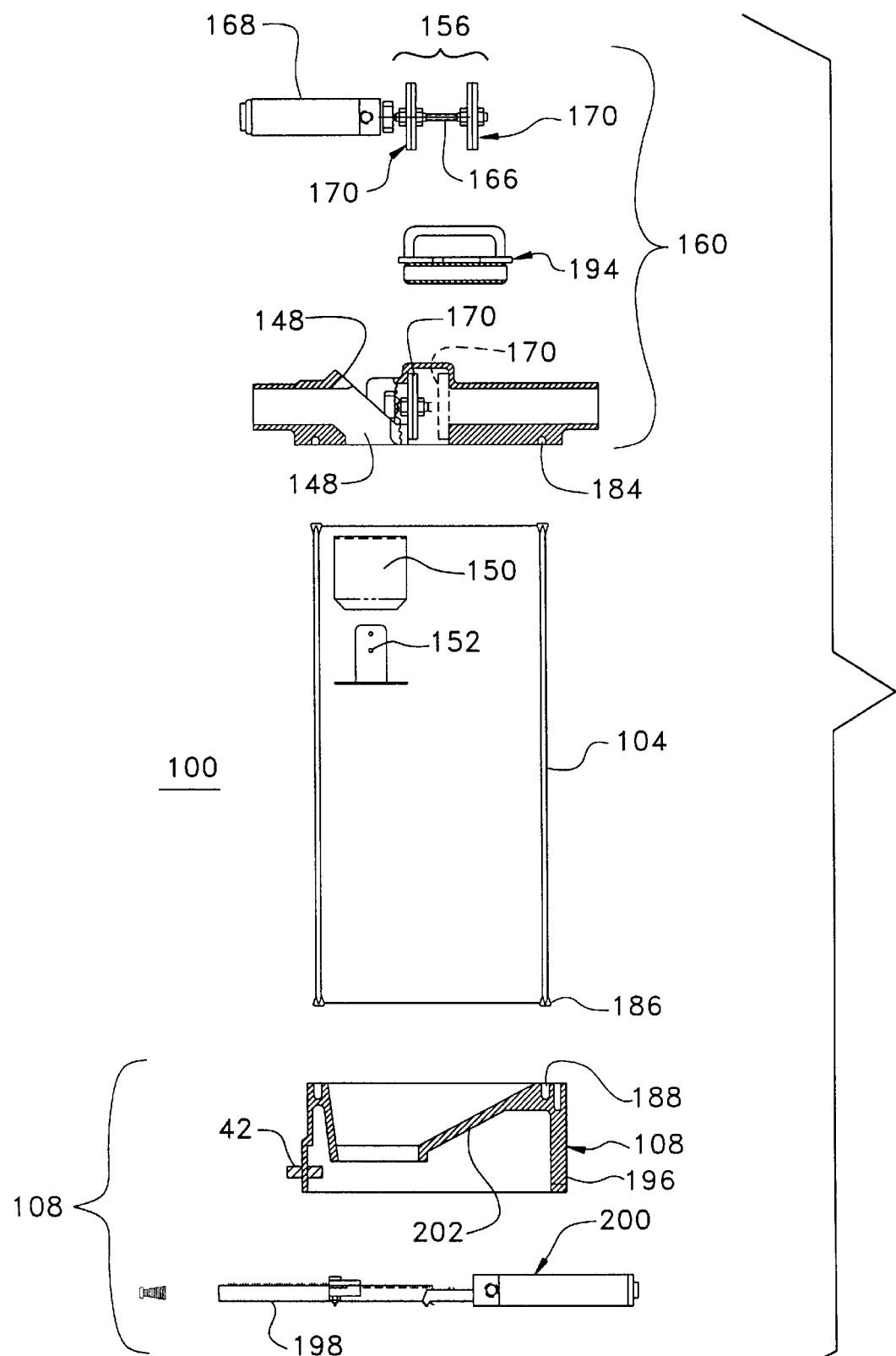
FIG. 1 is an exploded side view, partially in section, of receptacle apparatus manifesting aspects of the invention.
Figure 15:
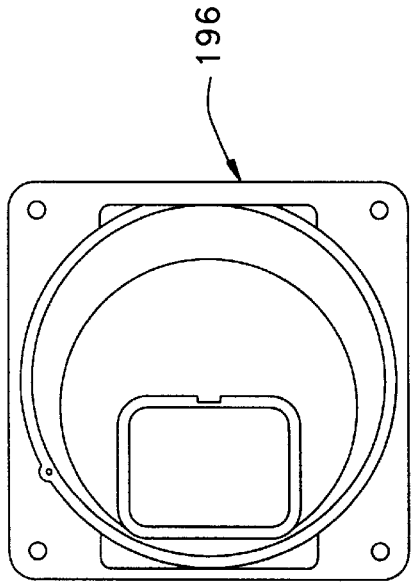
FIG. 15 is a view of the bottom of the casting illustrated in FIGS. 13 and 14 taken in the direction of lines and arrows 15—15 in FIG. 14.
Figure 16:
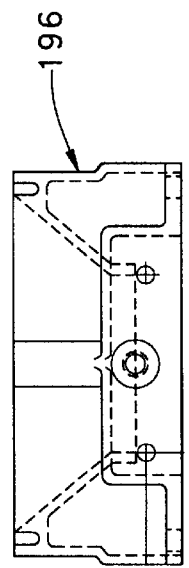
FIG. 16 is a front view of the casting illustrated in FIGS. 13, 14 and 15.
Figure 13:
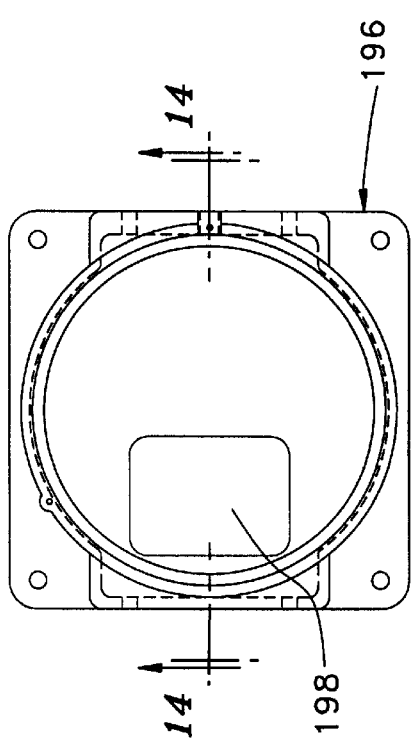
FIG. 13 is a view of the bottom plate portion of the casting forming substantially the bottom of the receptacle illustrated in FIG. 1 looking downwardly in FIGS. 1, 2 and 3.
Figure 14:
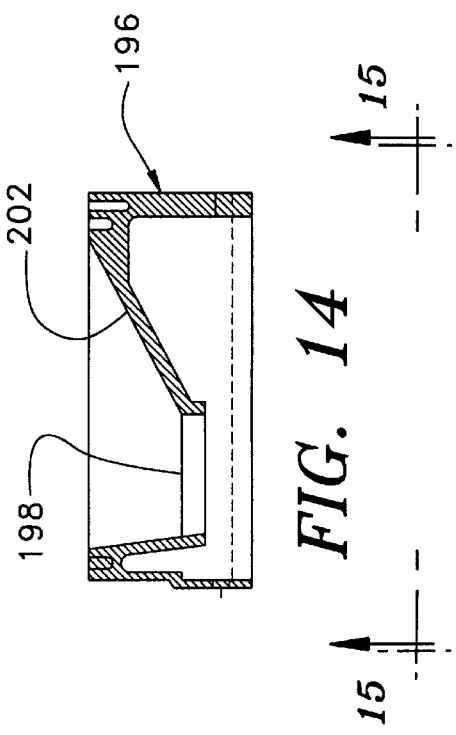
FIG. 14 is a sectional view of the casting illustrated in FIG. 13 taken at lines and arrows 14—14 in FIG. 13.

Referring to FIGS. 1 through 3 in particular, a receptacle manifesting aspects of the invention is designated generally 100. Receptacle 100 is preferably of generally cylindrical form and includes a cylindrical side wall designated generally 104, a top designated generally 106 and a bottom designated generally 108 in FIGS. 1, 2 and 3.

Top 106 is preferably formed substantially by a single, preferably aluminum, casting which is illustrated in greater detail in FIGS. 4 through 11. The casting substantially forming top 106 is designated generally 132 in the drawings.

Referring to the drawings of casting 132, specifically FIGS. 4 through 12, casting 132 is generally circular in shape and includes a air/material inlet connection designated generally 134 and an vacuum connection designated generally 136.

Formed within air/material inlet connection 134 is a air/material flow passageway designated generally 138 which is generally circular and is horizontally disposed at the end thereof remote from receptacle 100. The end of air/material inlet connection 134 and air/material flow passageway 138 remote from receptacle 100 is designated generally 140 in the drawings and is referred to hereinafter sometimes as a first end 140 of air/material flow passageway 138.

The horizontal portion of air/material flow passageway 138 is designated generally 142 and extends to a point of termination defined by a deflection member 144 which may be formed integrally as a portion of casting 132 but is more preferably provided as a plate secured in place by suitable bolts engaging tapped holes in casting 132. Deflection member is preferably a steel plate, providing additional hardness over the preferable aluminum of which casting 132 is cast. Providing deflection member 144 as a bolted-in-place steel plate facilitates removal and replacement of member 144 when required due to wear or in the event a clog develops in air/material flow passageway 138.

A vertically extending portion of air/material flow passageway 138 is designated generally 148, extends downwardly from deflection member 144 into the cylindrical interior of receptacle 100 and opens specifically into the interior of a baffle enclosure which is designated generally 150 in the drawings and which has resident therewithin a baffle designated generally 152.

Figure 24:
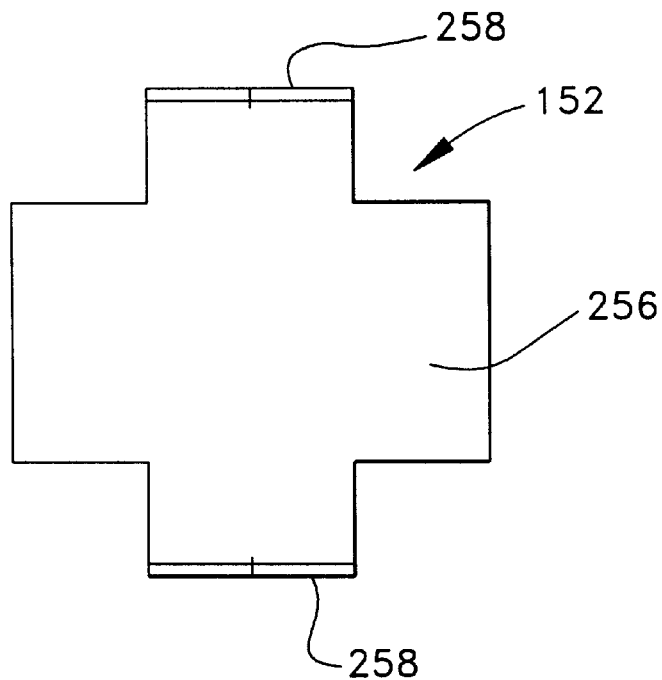
FIG. 24 is a top view of a baffle illustrated in FIG. 1.
Figure 25:
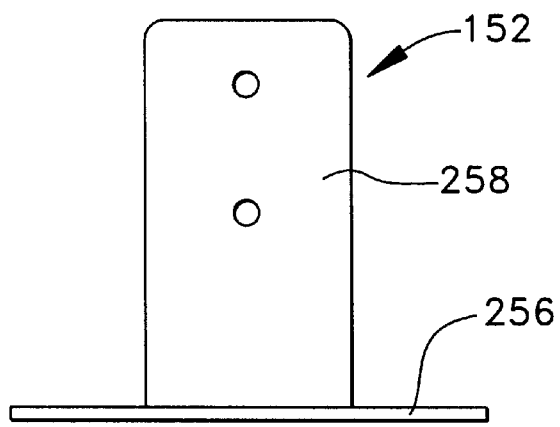
FIG. 25 is a front view of the baffle illustrated in FIG. 24.
Figure 26:
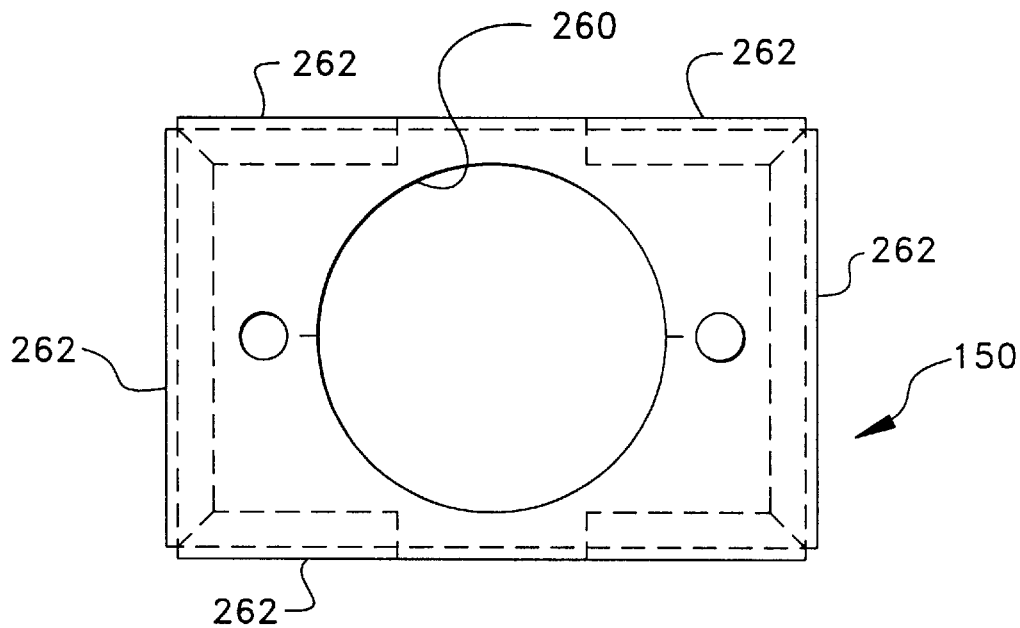
FIG. 26 is a top view of a baffle enclosure illustrated in FIG. 1

Baffle 152 illustrated in more detail in FIGS. 24 and 25 is generally "cross" shaped and includes a base portion 256 of the general cross shape and a pair of upstanding mounting ears 258. Baffle 152 fits within baffle enclosure 150 which is preferably fabricated of sheet metal and is of generally rectangular solid configuration in appearance. Baffle enclosure 150 has a generally rectangular top 266 which includes a large aperture 260 for communication between the interior of baffle enclosure 150 and the unnumbered outlet of vertical portion 148 of air/material flow passageway 138. The two smaller, unnumbered apertures in top 266 of baffle enclosure 150, illustrated in FIG. 26, are provided to facilitate securing baffle enclosure 150 and baffle 152 contained therewithin in place, preferably using suitable bolts entering tapped holes in casting 136. These holes have not been shown in the drawings to facilitate drawing clarity.

Figure 27:
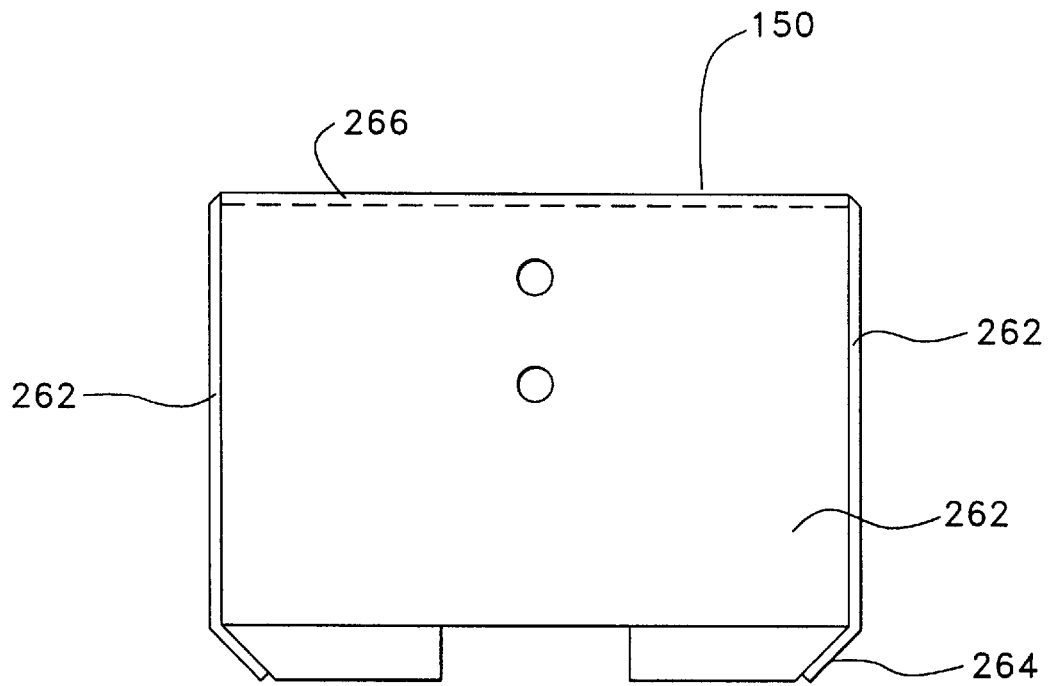
FIG. 27 is a front view of a baffle enclosure illustrated in FIG. 26.

Baffle enclosure 150 further includes sides 262, which preferably extend generally perpendicularly from top 266, and canted bottom lips 264 which are effectively inwardly inclined extensions of bottom portions of sides 262. Lips 264 preferably extend inwardly at approximately a forty-five degree angle as illustrated in FIG. 27 and are relatively short in length respecting the vertical height of sides 262, as also illustrated in FIG. 27 and as depicted in dotted lines in FIG. 26.

Baffle 152 fits within baffle enclosure with nut and bolt combinations preferably being used to secure baffle 152 and baffle enclosure 150 together. The holes illustrated in ears 258 of baffle 152, as shown in FIG. 25, align with the holes in walls 262 of baffle enclosure 150, as illustrated in FIG. 27, to permit securement of baffle 152 in place within baffle enclosure 150 by nut and bolt combinations.

When baffle 152 is secured in place within enclosure 150, base or cross portion of baffle 152 fits within or is inboard of canted bottom lips 264 of enclosure 150. Hence, entrained granular plastic resinous material pellets entering baffle enclosure 150 via aperture 260 are moving in a vertically downward direction and encounter base portion 256 of baffle 152. As the pellets hit base portion 256 of baffle 152, the pellets lose some of their kinetic energy and bounce randomly, with an upward component of motion and contact either the interior of sides 262 or top 266 of baffle enclosure 150. Such contact causes the granular plastic resinous material pellets to lose further kinetic energy and to fall downwardly.

As these pellets fall downwardly they pass through space separating edges of base portion 256 and the interior surfaces of sides 262 and, upon falling further, contact the upwardly and inwardly facing surfaces of canted bottom lips 264 and then fall out of baffle enclosure 150 essentially due to their own weight.

Pellets that fall downwardly and come to rest on base portion 256 are jostled therefrom by additional pellets entering the baffle enclosure; these previously resting pellets migrate to the edge of cross portion 256 and fall over the edge, contacting the inner surface of bottom lips 264 and then fall into receptacle 100.

Hence, granular plastic resinous material pellets entrained in air entering receptacle 100 via air/material flow passageway 138 have their velocity changed (and kinetic energy reduced) once by encounter with deflection member 144, which changes the direction of travel of the pellets by ninety degrees, have their direction of flow changed (and their kinetic energy reduced) a second time by encounter with base portion 256 of baffle 150 and have their direction of flow of travel changed (and their kinetic energy reduced) a third time by contact with canted bottom lips 264, and possibly with sides 262 of baffle enclosure 150, before entering the interior of receptacle 100. This "triple" contact, with three different solid surfaces, serves to reduce the kinetic energy of the entering granular plastic resinous material pellets preferably to essentially zero.

Casting 132 further includes a vacuum passageway designated generally 154 which extends generally horizontally from a valve member 156 to an orifice defined by vacuum connection 136 at a radially outward extremity of casting 132. Vacuum passageway 154 is generally preferably circular in cross-section and of relatively constant diameter from valve member 156 to the outlet end defined by vacuum connection 136.

In the portion of vacuum passageway 154 within which valve member 156 resides, which portion has been designated 158 in the drawings and is referred to herein as a central portion of vacuum passageway 154, the passageway is of larger diameter and includes a downwardly facing opening 160 communicating with the interior of receptacle 100. Further communicating with vacuum passageway 154 and specifically with central portion 158 is an air inlet passageway 162, which is best shown in FIGS. 4 and 10 as well as in FIG. 6. Air inlet passageway 162 communicates with ambient air via an orifice shown in FIG. 6 and designated 164; alternatively, air communication between air inlet passageway 162 and ambient air may be facilitated by passage of air around a shaft 166 of a first pneumatic piston-cylinder combination designated generally 168. The pneumatic piston-cylinder combination 168 is preferably fixed in position on casting 132 and actuates valve member 156.

As best illustrated in the exploded view of FIG. 1, piston-cylinder combination 168 preferably has valve member 156 mounted on shaft 166 where valve member 156 preferably includes a movable, reciprocal disk assembly designated generally 170.

Disk assembly 170 preferably includes a central metal disk 172 preferably sandwiched between a pair of rubber seating gaskets, of substantially the same diameter as metal disk 172, where the gaskets are designated 174 and are preferably held in place about disk 172 on shaft 166 by lock nuts 176 which are separated from gaskets 174 by washers 178, all as illustrated in the exploded view of FIG. 28 and in FIG. 29.

Piston-cylinder combination 168 preferably moves valve member 156 between two positions. At one position valve member 156, specifically disk assembly 170 which is illustrated at the left-most extremity of its travel in FIGS. 1 and 2, is in abutting contact with a first annular valve seat 180 defined by the interior portion of casting 132 where vacuum passageway 154 enlarges to embrace central portion 158. At this position vacuum passageway 154 is open by virtue of the position of disk 170 in FIGS. 1 and 2.

When disk 170 is moved to the right-most extremity of its travel, air inlet passageway 162 is open due to disk 170 in FIGS. 1 and 2 being spaced away from a second annular valve seat 182 defined by juncture of air inlet passageway 162 with central portion 158 of vacuum passageway 154. At this position of valve member 156, ambient pressure exists within receptacle 100 due to communication of the interior of receptacle 100 with ambient air preferably via air inlet passageway 162. Passageway 162 is best illustrated in the drawing figures depicting casting 132 forming top 106 of receptacle 100; these are drawing FIGS. 4 through 12, as well as FIGS. 1 and 2.

When pneumatic piston-cylinder combination 168 is actuated to move valve member 156 to the left in FIGS. 1 and 2, disk 170 moves against second annular valve seat 182 thereby preventing communication between the interior of receptacle 100 and ambient via air inlet passageway 162. At that position, disk 170 in FIG. 2 is removed from first annular valve seat 180, thereby permitting vacuum drawn through vacuum passageway 154 to create vacuum within the interior of receptacle 100. Hence, pneumatic piston-cylinder combination 168 operates valve member 156 to move disk 170 from a position of sealing off the vacuum source line from the interior of receptacle 100 to a position of sealing off an opening to atmosphere and hence sealing the interior of receptacle 100 from ambient.

When disk 170 is in position blocking vacuum passageway 154 but passageway 162 is open for atmospheric air to enter receptacle 100, this allows rapid emptying of receptacle 100 when material temporarily stored therein is evacuated through the bottom of receptacle 100. When disk 170 is at its alternate position the air passageway 162 to atmosphere is blocked and the vacuum line defined by vacuum passageway 154 communicates with the receptacle interior.

Casting 132 preferably includes a circumfrential groove 184 formed in a downwardly facing surface of casting 132, into which fits preferably cylindrical side wall 104 of receptacle 100. Cylindrical side wall 104 is preferably clear plastic tubing, preferably polycarbonate, and is preferably about 8 inches in diameter and preferably about 14 inches in length. Annular gaskets 186 may be provided around the upper and lower edges of cylindrical side wall 104 to facilitate sealing the upper edge of cylindrical side wall 104 in cylindrical groove 184 of casting 132 and sealing the lower edge of cylindrical side wall 104 in a corresponding annular groove 188 formed in bottom 108 of receptacle 100.

The assembly defining receptacle 100 is preferably secured together by tie rods 190 which are preferably secured in suitable apertures formed in casting 132 and in bottom 108; one such tie rod 190 is illustrated in FIG. 2. The tie rods urge casting 132 and bottom 108 towards one another.

Top 106 further include an access port 192 provided as a bore in casting 132. Access port 192 illustrated in FIGS. 4 and 5 is preferably closed by a removable plug 194 illustrated in FIG. 1.

Plug 194 preferably includes a gasket to provide an air-tight seal at access port 192 during operation of receptacle 100 and the vacuum loading system. The access port permits access to the interior of receptacle 100 in the event of a material clog during operation.

Bottom 108 of receptacle 100 is preferably formed substantially by a casting 196 shown in section in FIGS. 1 and 2 and further preferably includes a slide gate, designated generally 198 in FIGS. 1 and 2, which is preferably controlled by a second preferably pneumatic piston-cylinder combination 200. Casting 196 is preferably generally circular or cylindrical in configuration and preferably includes a downwardly sloping pan portion 202. The slope of pan portion 202 insures that granular material within receptacle 100 rests on slide gate 198. This is desirable in order so that granular material flows downwardly out of receptacle 100 upon actuation of second pneumatic piston-cylinder combination 200 opening slide gate 198. Slide gate 198 may be equipped with an o-ring for an improved vacuum seal, if necessary. Casting 196 is preferably aluminum.

During normal operation slide gate 198 at the bottom of receptacle 100 is normally open and closes only to enable vacuum to be drawn in receptacle 100. When the timer associated with the microprocessor times out and actuates valve member 156 moving disk 170 to simultaneously break communication between the interior of receptacle 100 and vacuum passageway 154 and allow communication between the interior of receptacle 100 and ambient air, slide gate 198 is opened essentially simultaneously by the microprocessor actuating pneumatic piston-cylinder combination 200.

A capacitive type material sensor 42 is preferably provided in a suitable aperture formed in casting 196 at the position illustrated in FIG. 1. Capacitive material sensor 42 when provided at this position provides an accurate gauge of the presence or absence of the required granular material being within receptacle 100. Alternatively, a capacitive material sensor may be provided within the preferably transparent polycarbonate wall 104 of receptacle 100. However, positioning capacitive material sensor 42 as illustrated in FIG. 1, secured within an orifice or aperture within casting 196, is preferred.

Figure 17:
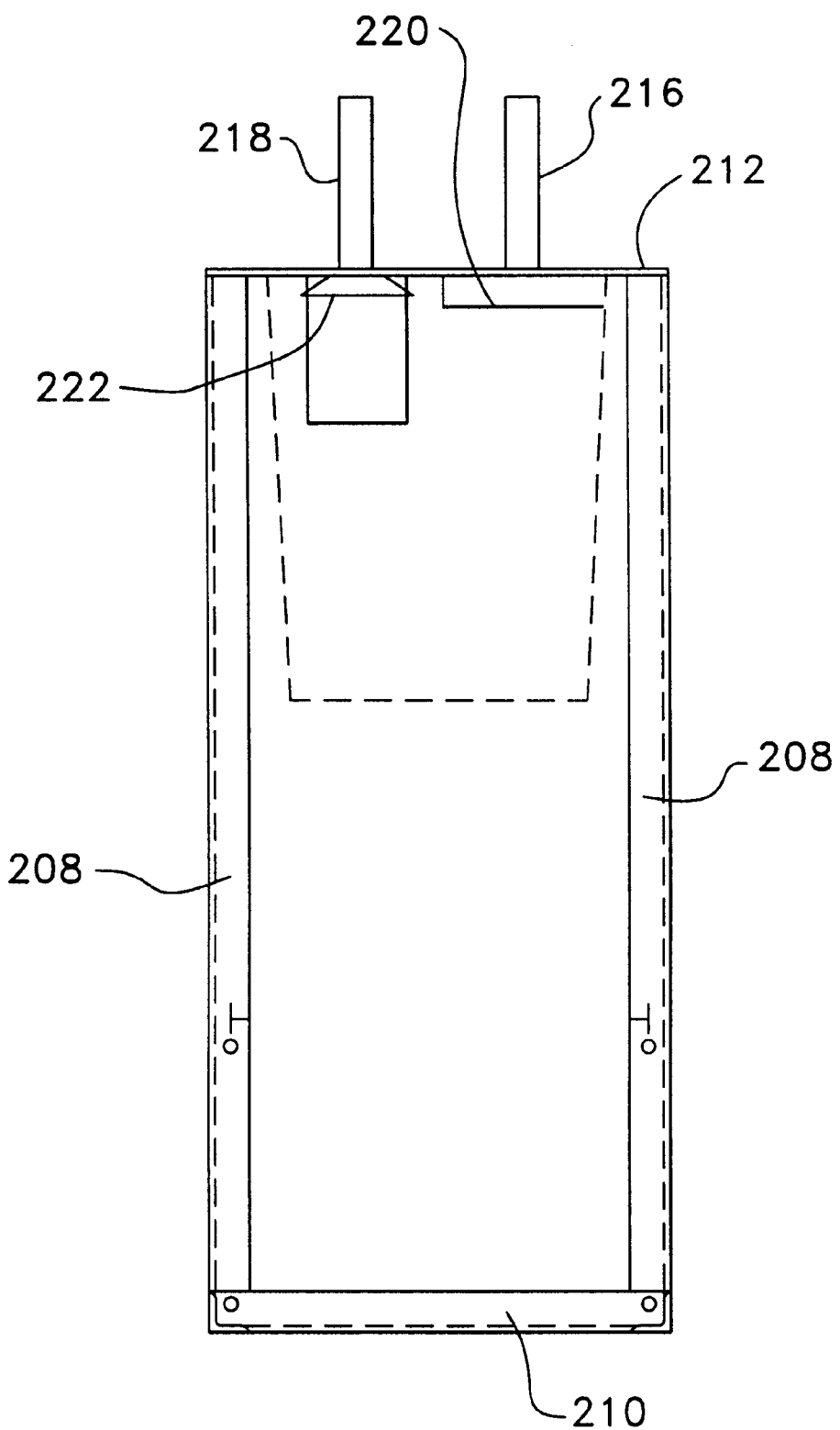
FIG. 17 is a schematic view of a power filter station manifesting aspects of the invention.
Figure 18:
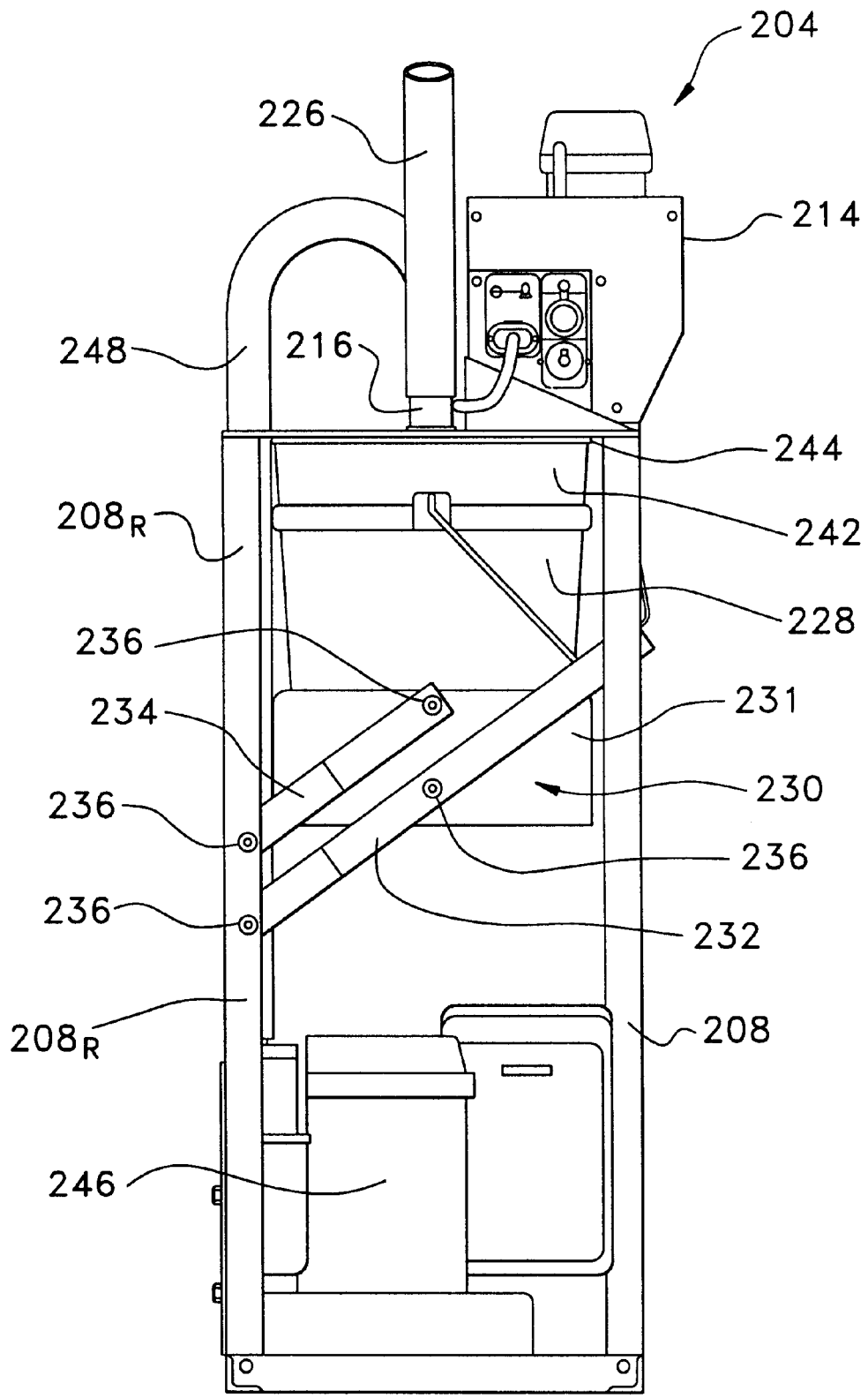
FIG. 18 is a side elevation of a power filter station manifesting aspects of the invention.
Figure 19:
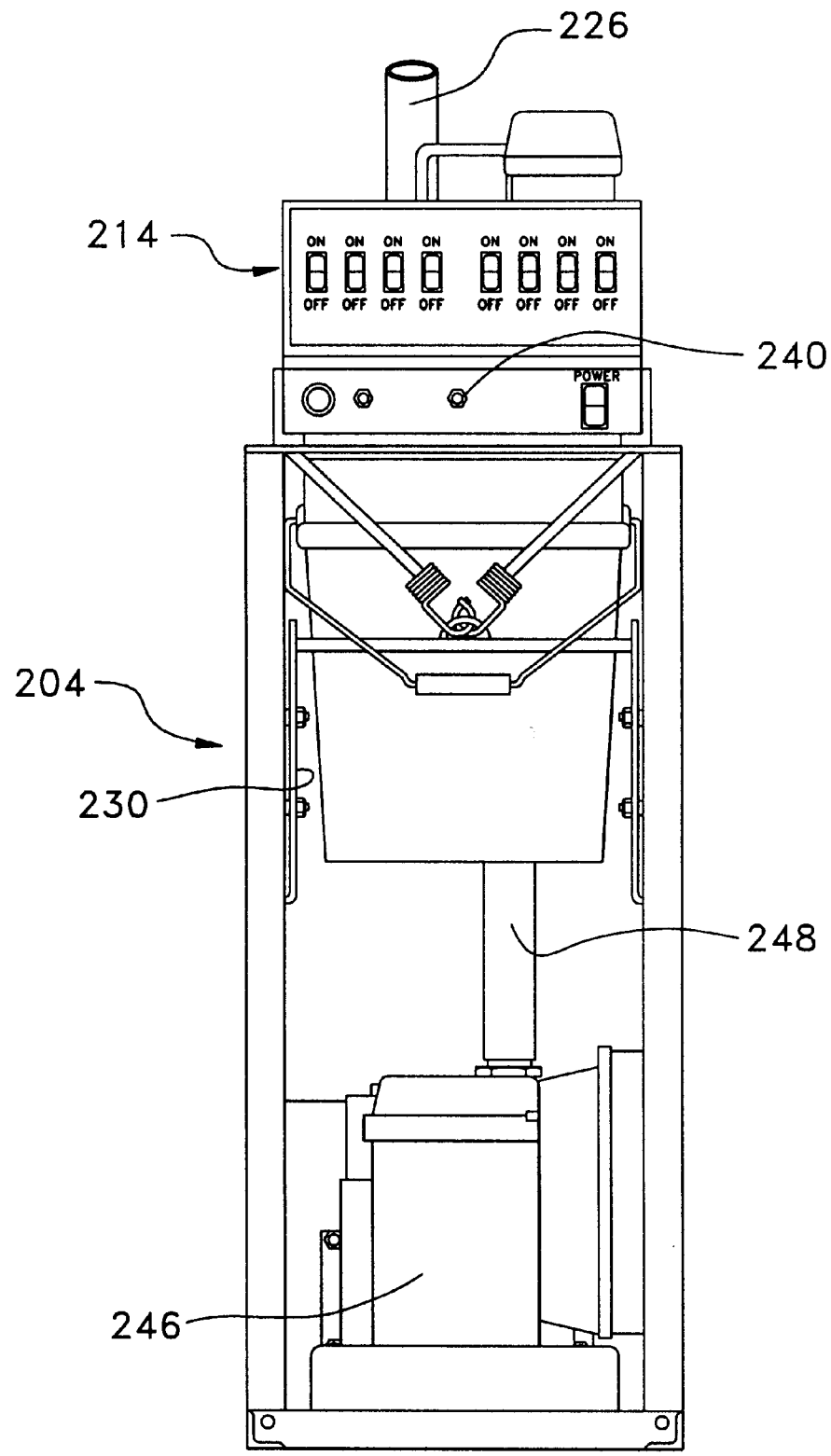
FIG. 19 is a front view of the power filter station illustrated in FIG. 18.

A power filter station is illustrated schematically in FIG. 17 and in more detail in FIGS. 18 and 19.

In FIG. 17 where the power filter station is shown in schematic form, the station is designated generally 204 and is preferably constructed utilizing a preferably steel frame designated 206 which preferably includes four steel uprights 208, a steel base member 210 and a plate, which is preferably steel, affixed to the upper extremities of uprights 208 and designated 212, which serves to support the electronic controls for the vacuum loading system where those controls are designated generally 214 in FIGS. 18 and 19.

Power filter station 204 includes an air inlet conduit 216 and a filtered air outlet conduit 218, both of which are affixed to plate 212, preferably by welding, and are aligned with apertures of size corresponding to the interiors of conduits 216, 218 for flow of unfiltered air and filtered air respectively into and out of power filter station 204.

Connected to plate 212 and extending away therefrom initially at substantially a right angle and then closer to parallel with plate 212 is a deflector plate 220 positioned so that air entering the filter through conduit 216 encounters deflector plate 220. As a result air entering the filter is forced to change direction and lose some of its kinetic energy due to encounter with deflector plate 220.

There is further provided about the aperture in plate 212 communicating with filtered air outlet conduit 218 a preferably wire frame 222 about which a filter bag 224 is mounted with wire frame 222 serving to prevent the collapse of filter bag 224 as air leaves the filter via conduit 218.

Conduits 216, 218 may be one and one-half inch outside diameter tubes about which flexible plastic tubular sleeves may be fitted to connect conduits 216, 218 to other portions of the vacuum loading system. One of these tubular sleeves is designated 226 in FIG. 18 and is shown in position over air inlet conduit 216.

There may further be included as a portion of power filter station 204 a collection receptacle 228 which may be a conventional five gallon plastic bucket which is preferably pressed to seal against plate 212. A gasket may be utilized at the area of contact between collection receptacle 228 and plate 212 to provide a substantially air tight seal. Collection receptacle 228 is preferably supported by and sits in a tray 230 which is supported by two linkage bars 232, 234, with the longer linkage bar denoted as a first linkage bar and designated 232 in the drawings. The shorter linkage bar is referred to as a second linkage bar and is designated 234 in the drawings. Connection between tray 230 and first and second linkage bars 232, 234 is by suitable pivotal connections designated 236 in the drawings. First and second linkage bars 232, 234 are respectively secured to rear ones of uprights 208 with these being designated $208_R$ in FIG. 18.

As illustrated in FIG. 18 there may be optionally provided a cylindrical tubular extension, designated 242 in FIGS. 18 and 19, between the upper lip of collection receptacle 228 (which is preferably an conventional five gallon pail as indicated above), and plate 212 supporting electronic controls 214. A gasket member 244 may be provided between extension 242 and plate 212 and another gasket, not shown but denoted generally by the line between collection receptacle 228 and cylindrical extension 244, may further be provided to assure the vacuum-tight seal between cylindrical extension 242 and collection receptacle 228.

During operation of the vacuum loading system a blower, which is designated generally 246 and illustrated in FIGS. 18 and 19, driven by an appropriate motor is used to draw vacuum through line 248 which preferably exits from filter 224 via connection with filtered air outlet conduit 218 as illustrated schematically in FIG. 17. Line 248 is hidden from view in FIGS. 18 and 19 by conduit 216 and electronic controls 214 respectively. Air is drawn into the power filter station via flexible plastic tubing (or some other material) conduit 226 which is connected to air inlet conduit 216 as illustrated in FIG. 18 and is also connected to vacuum connection 136 and hence to vacuum passageway 154 of top 106 of receptacle 100.

Air inlet conduit 216 may be connected to a plurality of vacuum passageways 154 associated with the plurality of receptacles 100 via manifold 22 or by various splitters. Hence, power filter station 204 may serve a plurality of receptacles 100 as illustrated in FIG. 1, just as do electronic controls 214 and the associated microprocessor.

Pivotal connections 236 of first and second linkage bars 232, 234 with rear upright $208_R$ are separated by a vertical distance which is the same vertical distance by which pivotal connections 236 of first and second linkage bars 232, 234 are separated at the connection with tray 230. This arrangement assures that as tray 230 is raised and lowered by rotation of first and second linkage bars about their points 236 of pivotal connection with upright $208_R$, tray 230 remains level at all times since first and second linkage bars 232, 234 remain parallel one to another.

The configuration of first linkage bars 232 is illustrated in FIGS. 22 and 23. First linkage bar 232 preferably has an offset, which has not been numbered in the drawings, in each of the first linkage bars to facilitate the bars fitting closely against vertical sides 231 of tray 230. Vertical sides 231 are clearly shown in FIG. 18 and appear as dark vertical lines in FIG. 19. First linkage bar 232 preferably includes an ear portion 233 separated from a main portion 250 by an unnumbered offset portion. Main portions 250 of two first linkage bars 232 are preferably connected by a rod 252 to which a handle is affixed to facilitate raising and lowering of tray 230 on which collection receptacle 228 rests.

Second linkage bar 234 is illustrated in greater detail in FIGS. 20 and 21 and similarly includes an ear portion 235 and a main portion 254 where main and ear portions 235, 254 are separated by an unnumbered offset portion similarly to first linkage bar 232.

When the vacuum loading system is used, typically a plurality of receptacles 100 are provided with each receptacle 100 being located above a hopper or storage bin associated with a weigh scale blender or other plastics and/or granular material processing machinery as illustrated in FIG. 30. The receptacle 100 above the hopper of the weigh scale blender may include a material level sensor 42. When the sensor such as sensor 42 senses that the material level is excessively low, below a preselected level, the sensor provides a signal sensed by a microprocessor forming a part of the central system for the vacuum loading system. The microprocessor may be housed with other electronic controls 214 positioned on plate 212 supported by uprights 208 of a power filter station 204 illustrated in FIGS. 18, 19 and 30.

When the microprocessor receives a signal indicating that the material level is low in a receptacle 100 and hopper associated with a material level sensor 42 of interest, the microprocessor actuates second pneumatic piston-cylinder combination 200 thereby closing slide gate 198. (Granular material, which was within receptacle 100 has already flown downwardly out of receptacle 100 through slide gate 198 into the associated hopper. Downward material flow out of receptacle 100 into the associated hopper has continued until receptacle 100 was empty.)

When receptacle 100 is empty valve member 156 (which had been positioned to permit ambient air flow into receptacle 100 to facilitate the downward flow of material out of receptacle 100) is positioned by pneumatic piston-cylinder combination 168 moving disk 170 to the left in FIGS. 1 and 2 thereby sealing the interior of receptacle 100 from ambient air and facilitating communication between the interior of receptacle 100 and vacuum line 154. As vacuum is drawn from an associated storage drum 18 via the associated lance 20 and supply hoses 24 through line 154, a vacuum is created within the interior of receptacle 100 and an air-material mix is drawn through air-material flow passageway 138.

The air-material mix initially encounters deflector member 144, which results in a change in direction of the air stream with the material entrained therein, and then encounters baffle 152 within baffle enclosure 150. As the granular plastic material pellets contact baffle 152, they lose additional kinetic energy over and above that lost due to contact with deflector member 144 and fall to the bottom of receptacle 100. The air which had been carrying the granular plastic resinous material pellets is drawn out of receptacle 100 by vacuum drawn through vacuum passageway 154.

This loading of receptacle 100 with granular plastic resinous material pellets may continue until material sensor 42 provided in receptacle 100 senses that an adequate level of granular plastic resinous material pellets is within receptacle 100 whereupon a signal sent to the microprocessor by the sensor in receptacle 100 causes the microprocessor to actuate first pneumatic piston-cylinder combination 168 thereby moving disk 170 to the right in FIGS. 1 and 2, breaking the vacuum in receptacle 100 by causing the interior of receptacle 100 to communicate with ambient air and sealing vacuum passageway 154 from the interior of receptacle 100. Once the vacuum is broken within the interior of receptacle 100, no additional material flows since there is no pressure differential to cause the air/material mix to flow from associated granular material storage drum 18 through lance 20, associated material supply hose 24 and through air/material flow passageway 138 into receptacle 100.

As the preferred method for regulating and stopping the flow of material and particularly the entrained granular plastic resinous material pellets in the air stream into receptacle 100, the microprocessor controller preferably includes a timer. The timer has a preset time programmed therein for each receptacle 100 of interest and begins to time out when the microprocessor actuates first pneumatic piston-cylinder combination 168 of a receptacle 100 of interest, moving valve member 156 and particularly disk 170 to the left in FIGS. 1 and 2, thereby permitting vacuum to be drawn in receptacle 100 by vacuum in vacuum passageway 154, causing granular plastic resinous material pellets entrained in the air stream to enter receptacle 100 travel from associated granular material storage drum 18 through associated lance 20, associated supply hose 24 via air/material passageway 138.

When the timer associated with the microprocessor times out respecting the time for the receptacle 100 of interest, indicating that the desired level of granular plastic resinous material pellets is within receptacle 100, the microprocessor actuates first pneumatic piston-cylinder combination 168, moving valve member 156 and disk 170 to the right in FIGS. 1 and 2. This seals off vacuum passageway 154 from the interior of receptacle 100 and opens air inlet passageway 162, thereby providing communication between the interior of receptacle 100 and ambient air, thus stopping flow of granular plastic resinous material pellets entrained in the airstream moving through passageway 138 into the interior of receptacle 100.

Hence, when a signal is received from a material level sensor indicating that a hopper associated with a given receptacle requires additional material, slide gate 198, which had been open, is closed by the microprocessor actuating second pneumatic piston-cylinder combination 200. Preferably substantially simultaneously the microprocessor actuates first pneumatic piston-cylinder combination 168, moving valve member 156 to the left in FIGS. 1 and 2 thereby establishing vacuum communication between vacuum passageway 154 and the interior of receptacle 100, permitting vacuum to draw granular plastic resinous material pellets entrained in air into the interior of receptacle 100 from granular material storage drum 18 via lance 20 and material supply hose 24 connecting with air/material passageway 138.

As these operations occur the timer commences timing for that receptacle. Valve member 156 for the receptacle 100 of interest is maintained at its position, to the left in FIGS. 1 and 2, until the timer times out for the receptacle 100 of interest. Once the timer times out, the microprocessor actuates first pneumatic-piston cylinder combination 168 associated with the receptacle 100 of interest thereby moving valve member 156 associated with the receptacle 100 of interest to the right in FIG. 2, breaking the vacuum in receptacle 100 by opening air inlet passageway 162 to the interior of receptacle 100 thereby halting flow of granular plastic resinous material pellets entrained in air into the interior of receptacle 100; the microprocessor also opens slide gate 198 by actuating second piston-cylinder combination 200 thereby permitting the preselected amount of granular plastic resinous material pellets to flow downwardly out of receptacle 100 through slide gate 198 and into the hopper requiring this material. Such operation continues, cyclicly, until the associated hopper and the level sensor therein indicates that additional material is no longer required. The microprocessor preferably cycles continuously among all of receptacles 100 forming a part of a given system such as illustrated in FIG. 30 and accepts signals from material level sensors in receptacles 100 of the vacuum loading system.

Preferably, the level sensor is located in the receptacle 100 and the microprocessor programmed to provide material from receptacle 100 by actuating second pneumatic piston-cylinder combination 200 thereby opening slide gate 198 only when material is required by the receptacle hopper combination; the microprocessor effectuates filling of receptacle 100 by actuating first pneumatic piston-cylinder combination and moving valve member 156 to permit vacuum to be drawn in the interior of receptacle 100 whenever material sensor 42 within receptacle 100 indicates material is required.

The timing for a particular receptacle being loaded may be adjusted by an operator actuating a set timer button associated with the controller and microprocessor. A set timer button is illustrated schematically as a part of electronic controls 214 in FIG. 19 and is designated generally 240.

While any receptacle is being loaded, an attending operator may press and hold the set timer button. As long as the set time button is pressed, loading of the receptacle continues. When the operator releases the button, this signals the microprocessor to stop loading granular plastic resinous material into the receptacle which had been the subject of the loading operation and to reset the timing associated with that particular receptacle to a new time, which is defined as the time elapsed from commencement of loading of the associated receptacle until the operator released the set timer button. This arrangement permits an operator to watch the level of material rise in a receptacle 100, since cylindrical wall 104 is clear, and further permits the operator to stop the material flow into receptacle 100 when exactly the desired level of granular plastic resinous material pellets or other granular material is reached in receptacle 100. No trial and error is involved; one observation of the material flowing into a given receptacle 100 and actuation of the set timer button is all that is required.

The microprocessor portion of electronic controls 214 sequences serially among all of the receptacles 100 defining loading stations and actuates the pneumatic piston-cylinder combination 168 to load a given receptacle 100 upon sensing that receptacle 100 may require material, since a hopper located below and associated with a given receptacle 100 requires material from receptacle 100 via slide gate 198.

Individual loading of receptacles 100 and the push button-actuated updating of the loading time of individual receptacles 100, based on release of the set timer button by an operator, permits immediate adjustment of loading time of receptacles 100 as needed. Loading time of receptacles 100 can vary according to the particular material being loaded into a receptacle 100, the size of the feed line used to supply the material entrained in the air stream to receptacle 100, the distance a particular receptacle 100 is from the main supply of material, the horsepower of the blower being used to create the vacuum, and other variable environmental conditions; all of these can effect the time for loading of the desired material into receptacle 100. Adjustment of the loading times for the receptacles 100 is extremely easy since an operator need only observe the loading of a receptacle one time and press the button when the material reaches the desired level. With this system, each receptacle may have its own unique loading time, which can be easily and independently varied without respect to other receptacles forming a part of the system.

In accordance with the foregoing, a large number of receptacles can be utilized in a single vacuum loading system controlled by a microprocessor with only minimal attendance required by a human operator.

Figure 31:
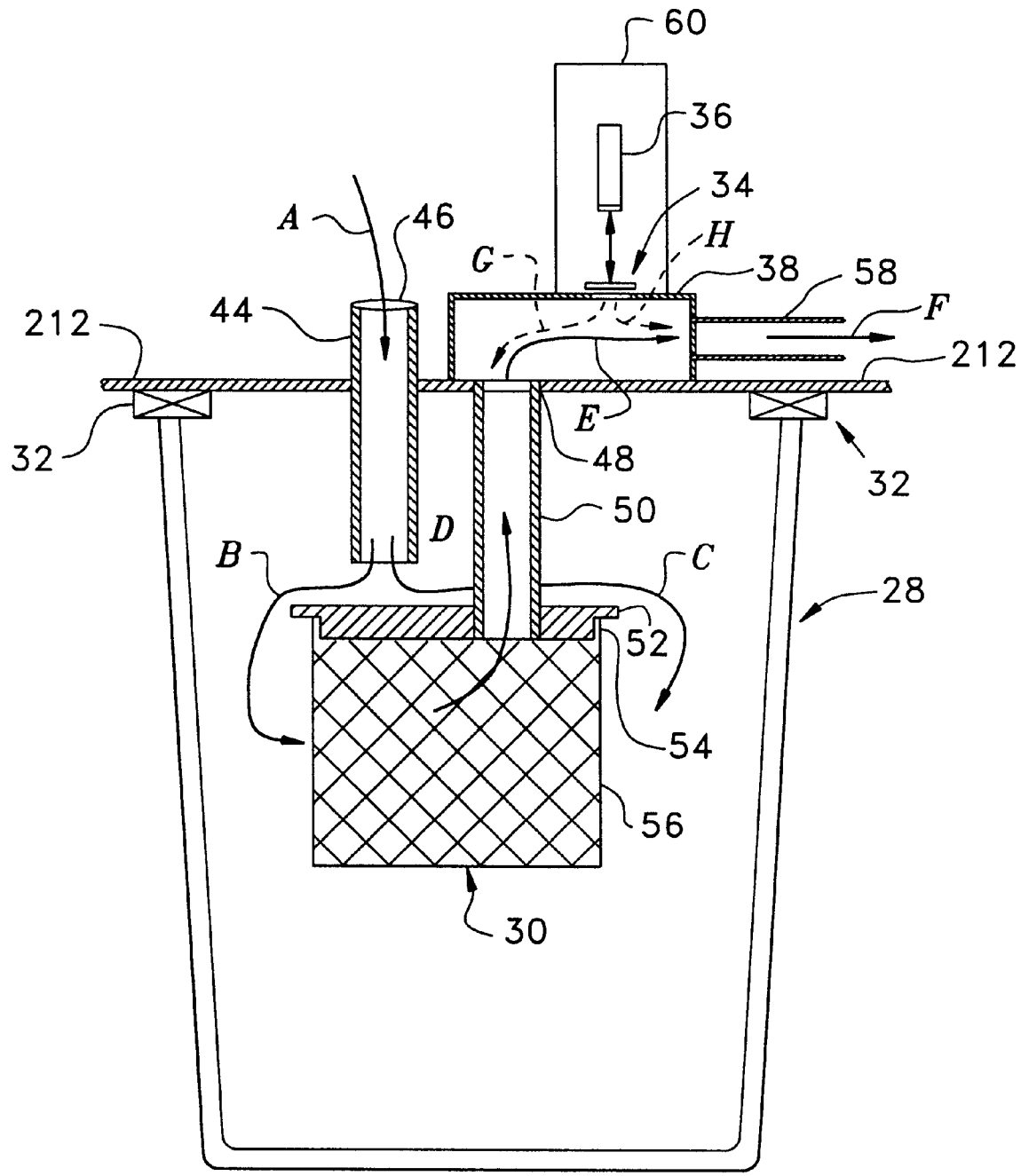
FIG. 31 is a schematic sectional view of a filter manifesting aspects of the invention.

FIG. 31 illustrates a preferred embodiment of a vacuum filter unit portion of the vacuum loading system of the invention where the vacuum filter unit includes a conventional bucket 28 which rests upon a shelf, such as indicated generally 230 in FIG. 18 and is moveable vertically by operation of first and second linkage bars 232, 234 pivoting about pivotal connections 236, all as illustrated in FIG. 18.

In the operating position, first and second linkage bars 232, 234 have rotated counter-clockwise, when considering FIG. 18, about pivotal connections 236 in response to spring bias of spring means, not shown, to urge bucket 28 upwardly against the downwardly facing surface of plate 212 as illustrated in FIG. 31. An annular preferably soft, rubber urethane gasket 32 mounted either on the vertical lip of bucket 28 or the lower surface of plate 212, provides an air-tight seal for vacuum to be drawn within bucket 28.

A vacuum inlet connection conduit 44 extends through plate 212, as illustrated in FIG. 31. An upper or distal end of vacuum inlet connection conduit 44 is designated 46 in FIG. 31 and is remote from plate 212 and bucket 28. Vacuum inlet connection conduit 44 is connected at distal end 46 to vacuum hose 26 illustrated in FIG. 30 so that vacuum may be drawn through vacuum inlet connection conduit 44.

Fixedly connected to an aperture 48 in plate 212 is a vacuum outlet connection conduit 50. A deflector plate 52 is fixedly connected to vacuum outlet connection conduit 50 proximate the end thereof which is remote from plate 212. Deflector plate 52 is illustrated in section in FIG. 31 to enhance drawing clarity. Deflector plate 52 is preferably circular and has a downwardly extending lip designated generally 54 in FIG. 31. Deflector plate 52 has an aperture formed therein so that deflector plate 52 may fit snugly about and be fixedly connected to vacuum outlet connection conduit 50 at the end thereof remote from plate 212.

Attached to lip 54 is a filter bag 56 providing the actual air filtering for the air drawn by vacuum into bucket 28 through vacuum inlet connection conduit 44.

Vacuum outlet connection conduit 50 exhausts through aperture 48 in plate 212 into plenumbox 38 which is fixedly connected to the upwardly facing surface of plate 212 as illustrated in FIG. 31.

Connected to plenumbox 38 is a vacuum drawing conduit 58 communicating with the interior of plenumbox 38. Vacuum drawing conduit 58 leads to a vacuum pump so that vacuum may be drawn through vacuum drawing conduit 58 and thereby from plenumbox 38, the interior of bucket 28, through conduit 44, etc.

Mounted in one wall of plenumbox 38, preferably the top wall as illustrated in FIG. 31, is a blow-by valve 34 which is actuated by a pneumatic piston cylinder combination schematically illustrated in FIG. 31 and designated 36. When opened by action of pneumatic piston cylinder combination 36, blow-by valve 34 allows ambient air to enter plenumbox 38 and be drawn through vacuum drawing conduit 58 by the vacuum pump, not illustrated in FIG. 31.

Desirably vacuum drawing conduit 58 and plenumbox 38 are fixedly secured together for example by welding and are fabricated of metal. Further desirably, blow-by valve 34 and pneumatic piston cylinder combination 36 actuating valve 34 are enclosed within a housing schematically illustrated in FIG. 31 and designated generally 60. Housing 60 is preferably welded or otherwise fixedly connected to the exterior of plenumbox 38 so that workers and others in the vicinity of the vacuum loading system cannot access blow-by valve 34 with their fingers. Similarly, a vacuum drawing conduit 58 is preferably sufficiently long that an operator cannot insert fingers into the interior of plenumbox 38 via vacuum drawing conduit 58. This is because the force supplied by pneumatic piston cylinder combination 36 to open or close blow-by valve 34 can be very substantial and the action of blow-by valve 34 is with sufficient force to sever one's finger.

During operation of this system when the vacuum is preferably drawn continuously by the vacuum pump running continuously and drawing vacuum through vacuum conduit 58. When material is being feed or drawn by vacuum into any one of receptacles 100, blow-by valve 34 is closed by pneumatic piston cylinder combination 36 so that vacuum may be drawn throughout the system by the vacuum pump. In this condition, air being drawn as vacuum enters bucket 28 to be filtered via entry through vacuum inlet connection conduit 44 as indicated by arrow A in FIG. 31. Air drawn through vacuum inlet connection conduit 44 by the action of the vacuum pump drawing a vacuum through vacuum drawing conduit 58 encounters defector plate 52 and is deflected in a manner indicated by arrows B and C in FIG. 31. This action serves to slow the air being drawn as vacuum from the receptacle of interest by operation of the vacuum pump.

This air or vacuum drawn into bucket 28 through vacuum inlet connection conduit 44 may have some particles of granular material therein depending upon what has happened in the receptacle through which the vacuum is being drawn. Air of the vacuum drawn air being deflected by plate 52 as illustrated by arrows B and C, works to slow the vacuum drawn air, spreading the vacuum drawn air and causing granular material carried by that air to collect in the bottom of bucket 28.

The vacuum drawn air is drawn by the vacuum through filter bag 56 going into an inlet of vacuum outlet connection conduit 50 as indicated by arrow D in FIG. 31. The vacuum drawn air exiting from vacuum outlet connection conduit 50 at aperture 48 is then drawn through plenumbox 38 as indicated by arrow E in FIG. 31 into vacuum drawing conduit 58 as indicated by arrow F in FIG. 31 and travels to the vacuum pump where the vacuum drawn air is exhausted to atmosphere.

Whenever the vacuum drawing phase of operation of the system is concluded and material is no longer being drawn into receptacles, vacuum is relieved by actuation of piston cylinder combination 36 opening blow-by valve 34 thereby letting air into plenumbox 38 whereupon this inlet air may propagate throughout the system as indicated by dotted arrows G and H in FIG. 31. This contributes to extending the life of the vacuum pump so that the vacuum pump is not continually trying to drawn a vacuum. If the pump continuously tries to draw a vacuum from a system which would be closed, this would very much shorten the life of the vacuum pump would overheat and rapidly fail.

In addition to air being permitted to enter the system by operation of blow-by valve 34, at the same time air is also permitted to enter the system at the top of the receptacles illustrated in FIGS. 1, 2, 4-12 and 30 when the piston cylinder combination 168 moves disk assembly 170 to the right, to the position illustrated in dotted lines in FIGS. 1 and 2. At this position, air is permitted to propagate by entering a given receptacle of interest through orifice 164 defining one end of inlet passage way 162 in casting 132 forming top 106 of a given receptacle 100.

The vacuum filter apparatus illustrated in FIG. 31 may serve many receptacles 100 connected to a common manifold illustrated in FIG. 30. Use of the air and vacuum filter apparatus illustrated in FIG. 31 is not limited to four receptacles as is illustrated in FIG. 30; the number of receptacles and associated equipment illustrated in FIG. 30 is by way of example only. Other numbers of components may be used together with a single air-vacuum filter apparatus such as illustrated in FIG. 31.

When the air vacuum filter apparatus illustrated in FIG. 31 is used with multiple receptacles 100, closure of the valve defined by disk 170 at the upper portion of receptacle 100 to effectuate a vacuum in a given receptacle 100 is accompanied by closure by blow-by valve 34 illustrated in FIG. 1, no matter which one of receptacles 100 as being vacuum loaded with granular material.

In the multiple station version of the vacuum loading system illustrated in FIG. 30, vacuum is drawn via vacuum hose "26" leading the vacuum connection conduit 44 and in turn vacuum is drawn through manifold 22 which serves all of the loading stations defined by receptacles 100, with loading of all such receptacles utilizing a single vacuum pump.

Valve 170 built into casting 132 forming top 106 of each receptacle 100 is maintained in a default position at which vacuum is shut off and air is allowed to enter receptacle 100 until such time as material needs to be vacuum loaded into receptacle 100. This default position of valve 170 is illustrated at dotted lines in FIGS. 1 and 2.

When a given receptacle requires material as sensed by capacitive sensor 42 mounted in casting 196 forming bottom 108 of receptacle 100, the microprocessor portion of the control electronics for the vacuum loading system senses that the material is needed at that receptacle 100 and operates to close valve 170 at the top of receptacle 100 thereby allowing vacuum to be drawn in the interior receptacle 100 thereby drawing air with granular resinous material entrained therein from an associated storage drum 18 through a lance 20 and through a material supply hose 24 into the interior receptacle 100. Vacuum is drawn for a preselected time as controlled by the microprocessor, which preselected time may be adjusted by the operator in the manner indicated elsewhere herein.

The electronic control for the vacuum loading system is preferably provided in a housing which may rest on the top of plate 212; the electronic control system for the vacuum loading system is designated generally as 214 in FIGS. 18 and 19.

As illustrated in FIG. 19, in schematic fashion, electronic control 214, which includes a microprocessor and is connected to the vacuum pump, the blow-by valve 34, all preferably capacitive material sensor 42 and all of the preferably pneumatic piston-cylinder combination may handle a multiple number of receptacles where facility to control eight receptacles is illustrated in FIG. 19 as indicated by eight "on-off" buttons, one for each receptacle of interest.

A single button 240 is provided for an operator to reset fill time for each receptacle 100 controlled by electronic control 214. The microprocessor portion of electronic control 214 sequences through receptacles 100 serially one at a time, so that the operator, if desiring to adjust the fill time for any given receptacle, merely waits for that receptacle to be activated and for material to begin to flow into that receptacle. Once this occurs, the operator presses button 240 and continues to observe the material flowing into the receptacle 100 of interest. When the material level in receptacle 100 reaches the level the operator believes appropriate, the operator releases button 240. Such release of button 240 sets a new stop point or stop time and hence sets a new elapsed time for filling of a given receptacle 100. Button 240 does not regulate the time at which a given receptacle starts to fill; button 240 regulates shut off time. In that regard, it is an important feature of this invention to provide a transparent or at least translucent and in any event visible material level receptacle allowing an operator to observe that fill is proceeding respecting such receptacle and to regulate such fill by depressing and then releasing button 240 to adjust shut off time for the receptacle 100 of interest.

Material loading conditions change due to changes in temperature, humidity, changes in material and the like. Typically, loading time for each receptacle must be adjusted every day or two to maintain the vacuum loading system of the invention in the optimum mode for operation.

What is claimed is:

1. Apparatus for providing granular material to a loading hopper preparatory to processing comprising:
   a. an at least partially transparent receptacle for receiving said material prior to processing thereof by machinery supplied by said hopper, said receptacle having a top including first valve means for selectably connecting said receptacle to vacuum or ambient air;
   b. means for drawing vacuum in said receptacle;
   c. conduit means for connecting said receptacle to a supply of said granular material;
   d. second valve means for selectably permitting material flow from said receptacle into said hopper; and
   e. means for temporally adjustably closing said first valve means to vacuum, and hence opening said first valve means to air, and opening said second valve means responsively to visually detected presence of a suitable amount of material in said receptacle.

2. Apparatus of claim 1 further comprising baffle means at an inlet to said receptacle for directionally deflecting flow of material into said receptacle from said conduit means thereby reducing kinetic energy of said material.

3. Apparatus of claim 1 wherein said receptacle is cylindrical and transparent.

4. Apparatus of claim 3 wherein ends of said receptacle are castings.

5. Apparatus of claim 4 wherein said first and second valve means are within said castings.

6. Apparatus for providing plastic resin material to a plurality of loading hoppers and maintaining said material in said hoppers at or above preselected levels preparatory to delivery of said material therefrom for processing comprising:
   a. a plurality of temporary material storage receptacles for receiving said plastic resin material prior to processing thereof by machinery supplied by respective ones of said hoppers;
   b. means for drawing vacuum in said receptacles;
   c. first valve means selectably connecting said receptacles with said vacuum drawing means;
   d. conduit means for connecting said receptacles to respective supplies of plastic resin material;
   e. second valve means for selectably permitting plastic resin material flow from said receptacles into associated hoppers; and
   f. manually adjustable shutoff time control means for closing said first and second valve means, thereby permitting air flow into respective receptacles responsively to visually detected criteria respecting level of said plastic resin material in said receptive receptacle.

7. Apparatus of claim 6 wherein said first and second valve means are actuated by pneumatic piston-cylinder combinations.

8. Apparatus of claim 6 wherein at least one of said second valve means is a slide gate valve.

9. Apparatus of claim 6 wherein at least one of said second valve means is a flap maintained closed by gravity.

10. Apparatus of claim 6 further comprising baffle means within at least one of said proximate an inlet to said receptacle within which said baffle means is disposed from said conduit means for directionally plurally deflecting flow of airborne plastic resin material drawn into said receptacle within which said baffle means resides from said conduit means thereby dissipating kinetic energy of said moving airborne resin material.

11. Apparatus of claim 10 wherein said baffle includes a generally parallel piped-shaped housing into which said material entrained in air enters.

12. Apparatus of claim 10 wherein said baffle consists of planar surfaces.

13. Apparatus of claim 6 wherein at least one of said receptacles has a cast top including means for connecting said respective receptacle to vacuum or ambient air by simultaneously opening a connection to one of said vacuum and said ambient air and closing a connection to the remaining one of said vacuum and ambient air.

14. Apparatus of claim 6 further comprising means for connecting said conduit means for plastic resin material supply to said respective receptacle including a plate inclined at an angle to flow direction of material drawn to said respective receptacle for downwardly deflecting flowing material entering said respective receptacle.

15. A method for providing plastic resin material to a loading receptacle and periodically replenishing said receptacle with said material, comprising:
   a. drawing a vacuum within said receptacle thereby inducing plastic resin material flow from a plastic resin material supply into said receptacle and marking the commencement of said drawing as a vacuum drawing starting time; and
   b. stopping said induced plastic resin material flow into said receptacle and marking said stoppage as a vacuum drawing stopping time responsively to optically detected sensed material level within said receptacle.

16. The method of claim 15 further comprising repeatedly drawing said vacuum for a filling period defined by the difference between said starting and stopping times and adjusting said filling period if needed by changing said stopping time responsively to observation of a desired material level in said receptacle.

17. The method of claim 15 wherein changing said filling period responsively to observation of a desired material level in said receptacle is performed by actuating a switch during said filling period and deactuating said switch to define a new stopping time.

18. The method of claim 15 further comprising directionally deflecting plastic material flowing into said receptacle upon entry thereinto, thereby reducing kinetic energy of said flowing material.

19. The method of claim 15 further comprising thrice directionally deflecting said material as said material enters said receptacle.

20. A method for providing plastic resin material to a plurality of loading receptacles and periodically replenishing said receptacles with said material, comprising:
   a. drawing vacuum within said receptacles serially thereby inducing plastic resin material flow from a plastic resin material supply into each of said receptacles in a selected sequence and marking the commencement of said drawing for each of said receptacles as a vacuum drawing starting time for a receptacle of interest; and
   b. stopping flow of material into said receptacles and separately marking said stoppage as a vacuum drawing stopping time for each of said receptacles responsively to optically detected sensed material level within each of said receptacles.

21. The method of claim 20 further comprising serially repeatedly drawing said vacuum for each of said receptacles for a filling period defined by the difference between said starting and stopping times and adjusting said filling period separately for each of said receptacles if needed by changing said stopping time responsively to observation of a desired material level in said receptacle.

22. The method of claim 21 wherein changing said filling period responsively to observation of a desired material level in a selected one of said receptacles is performed by actuating a switch during said filling period and deactuating said switch to define a new stopping time for said selected receptacle.

23. The method of claim 22 wherein a single switch is used to define a new stopping time for all of receptacles, as needed.

24. The method of claim 20 further comprising thrice directionally deflecting said material as said material enters said receptacle.

* * * * *